US012560230B2

(12) United States Patent
Lee et al.

(10) Patent No.: US 12,560,230 B2
(45) Date of Patent: Feb. 24, 2026

(54) ELECTRONIC APPARATUS HAVING TILTING PREVENTION STRUCTURE

(71) Applicant: Samsung Electronics Co., Ltd.,
Suwon-si (KR)

(72) Inventors: Wonho Lee, Suwon-si (KR);
Hyunggwang Kang, Suwon-si (KR);
Hojin Jung, Suwon-si (KR); Hyunju Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/758,903

(22) Filed: Jun. 28, 2024

(65) Prior Publication Data

US 2024/0352997 A1     Oct. 24, 2024

Related U.S. Application Data

(63) Continuation of application No. PCT/KR2022/021088, filed on Dec. 22, 2022.

(30) Foreign Application Priority Data

Feb. 14, 2022     (KR) ........................ 10-2022-0019207
Jul. 18, 2022     (KR) ........................ 10-2022-0088585

(51) Int. Cl.
*G06F 1/16* (2006.01)
*F16C 19/50* (2006.01)
(Continued)

(52) U.S. Cl.
CPC ............. *F16H 55/26* (2013.01); *F16C 19/50* (2013.01); *F16H 2019/046* (2013.01)

(58) Field of Classification Search
CPC .... F16C 19/50; F16H 19/04; F16H 2019/046; F16H 55/26; G06F 1/1624; G06F 1/1652;
(Continued)

(56) References Cited

U.S. PATENT DOCUMENTS 11,144,102 B2     10/2021   Kim
11,206,322 B2     12/2021   Cha
(Continued)

FOREIGN PATENT DOCUMENTS

KR          100558451 B1     3/2006
KR          100811779 B1     3/2008
(Continued)

OTHER PUBLICATIONS

Extended European Search Report dated Jan. 24, 2025 issued in European Patent Application No. 22926226.6.
(Continued)

*Primary Examiner* — Insa Sadio
(74) *Attorney, Agent, or Firm* — Nixon & Vanderhye, P.C.

(57) ABSTRACT

An electronic apparatus according to an embodiment comprises: a first housing; a second housing coupled to the first housing to be slidable; a flexible display disposed on a surface formed by the first housing and the second housing, and is configured to be expanded or contracted according to the slide-in or slide-out movement of the second housing; a rack gear fastened with the first housing; a pinion gear which is configured to be driven while engaging with the rack gear; a motor driver fastened with the second housing and configured to rotate the pinion gear; a bracket which surrounds part of the motor driver and the pinion gear, and is fastened with the second housing; and a rack gear case surrounding a first surface and both side surfaces of the rack gear.

20 Claims, 17 Drawing Sheets

(51) Int. Cl.
*F16H 55/26* (2006.01)
*F16H 19/04* (2006.01)

(58) Field of Classification Search
CPC ..... G06F 1/1677; H04M 1/02; H04M 1/0237;
H04M 1/0268
See application file for complete search history.

(56) References Cited

U.S. PATENT DOCUMENTS

| | | | |
|---|---|---|---|
| 11,474,565 B2 | 10/2022 | Choi | |
| 11,815,948 B2 | 11/2023 | Song | |
| 2006/0068859 A1 | 3/2006 | Lee et al. | |
| 2012/0314980 A1 | 12/2012 | Chen | |
| 2016/0057356 A1* | 2/2016 | Nagano | G09G 3/003 |
| | | | 348/333.06 |
| 2018/0267574 A1 | 9/2018 | Cho | |
| 2021/0099557 A1 | 4/2021 | Cha | |
| 2021/0213831 A1* | 7/2021 | Kang | B60K 35/50 |
| 2022/0124188 A1 | 4/2022 | Song | |
| 2023/0396698 A1 | 12/2023 | Kim | |

FOREIGN PATENT DOCUMENTS

| | | | |
|---|---|---|---|
| KR | 20110082943 | A | 7/2011 |
| KR | 101179115 | B1 | 9/2012 |
| KR | 101409510 | B1 | 6/2014 |
| KR | 20150037383 | A | 4/2015 |
| KR | 20160089164 | A | 7/2016 |
| KR | 20210037429 | A | 4/2021 |
| KR | 102281347 | B1 | 7/2021 |
| KR | 20210116542 | A | 9/2021 |
| WO | 2020019251 | A1 | 1/2020 |
| WO | 2021201309 | A1 | 10/2021 |
| WO | 2022019357 | A1 | 1/2022 |

OTHER PUBLICATIONS

International Search Report for PCT/KR2022/021088 mailed Mar. 24, 2023, 5 pages.
Written Opinion of the ISA for PCT/KR2022/021088 mailed Mar. 24, 2023, 5 pages.

* cited by examiner

210: 211, 216, 410
220: 221, 226, 420

601: 620, 630

ELECTRONIC APPARATUS HAVING TILTING PREVENTION STRUCTURE

CROSS-REFERENCE TO RELATED APPLICATIONS

This application is a continuation application, claiming priority under § 365 (c), of an International application No. PCT/KR2022/021088, designating the United States, filed on Dec. 22, 2022, in the Korean Intellectual Property Receiving Office and claiming priority to Korean Patent Application Nos. 10-2022-0019207, filed on Feb. 14, 2022, and 10-2022-0088585, filed on Jul. 18, 2022, in the Korean Intellectual Property Office, the disclosures of each of which are incorporated by reference herein in their entireties.

BACKGROUND

Field

The disclosure relates to an electronic device including a tilting prevention structure.

Description of Related Art

In order to achieve better portability and availability of electronic devices, flexible displays are being developed that can provide a large-screen display as required. Such a flexible display may refer to a foldable display, a rollable display, or a slidable display.

An electronic device may provide a display capable of being expanded or reduced, according to a state of use.

SUMMARY

Embodiments of the disclosure provide a structure for expanding or reducing a display, a housing of an electronic device may provide a structure capable of supporting a convertible flexible display. The electronic device may convert a flexible display to be expanded or reduced according to its state of use. Unintended deformation of the flexible display in such a converting process may be prevented. The electronic device may provide an internal structure for preventing the unintended deformation during a conversion process.

According to an example embodiment, an electronic device may include: a first housing, a second housing slidably coupled to the first housing, and a flexible display disposed on a surface formed by the first housing and the second housing, the flexible display configured to expand or contract as the second housing slides in or slide out; a rack gear coupled to the first housing, a pinion gear driven by engaging with the rack gear, and a motor coupled to the second housing and configured to rotate the pinion gear; a bracket surrounding a portion of the motor driving mechanism and the pinion gear and coupled to the second housing; a rack gear case surrounding a first surface of the rack gear and both lateral surfaces of the rack gear; wherein rack gear may include protrusions formed at lateral surfaces thereof, the protrusions being inserted into a portion of the rack gear case. The rack gear case may include coupling grooves into which each of the protrusions of the rack gear are inserted.

According to an example embodiment, an electronic device may include: a first housing; a second housing slidably coupled to the first housing; a flexible display disposed on a surface formed by the first housing and the second housing, the flexible display configured to expand or contract as the second housing slides in slides out; a rack gear coupled to the first housing; a pinion gear driven by engaging with the rack gear; a motor coupled to the second housing and configured to rotate the pinion gear; a bracket surrounding a portion of the motor driving mechanism and the pinion gear and coupled to the second housing; and a driving unit assembly including a rack gear case surrounding a first surface and both sides of the rack gear from one side surface of the bracket; wherein the rack gear case may include a plurality of bearings configured to guide the rack gear to make a linear reciprocating motion and disposed to face the first surface of the rack gear; and at least one of the plurality of bearings may be in contact with the rack gear.

According to an example embodiment, an electronic device including a tilting prevention structure may prevent deformation of a flexible display by providing a structure for preventing unintended tilting of a mechanical component.

According to an example embodiment, an electronic device including a tilting prevention structure may expand an internal mounting space of the electronic device by minimizing/reducing a size of the anti-tilting structure. With such an expanded internal mounting space, the electronic device may increase the capacity of the battery and may increase the usage time of the electronic device.

Effects that are obtainable from the disclosure are not limited to those mentioned above and other effects not mentioned herein may be clearly understood by those having ordinary knowledge in the art to which the disclosure belongs from the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
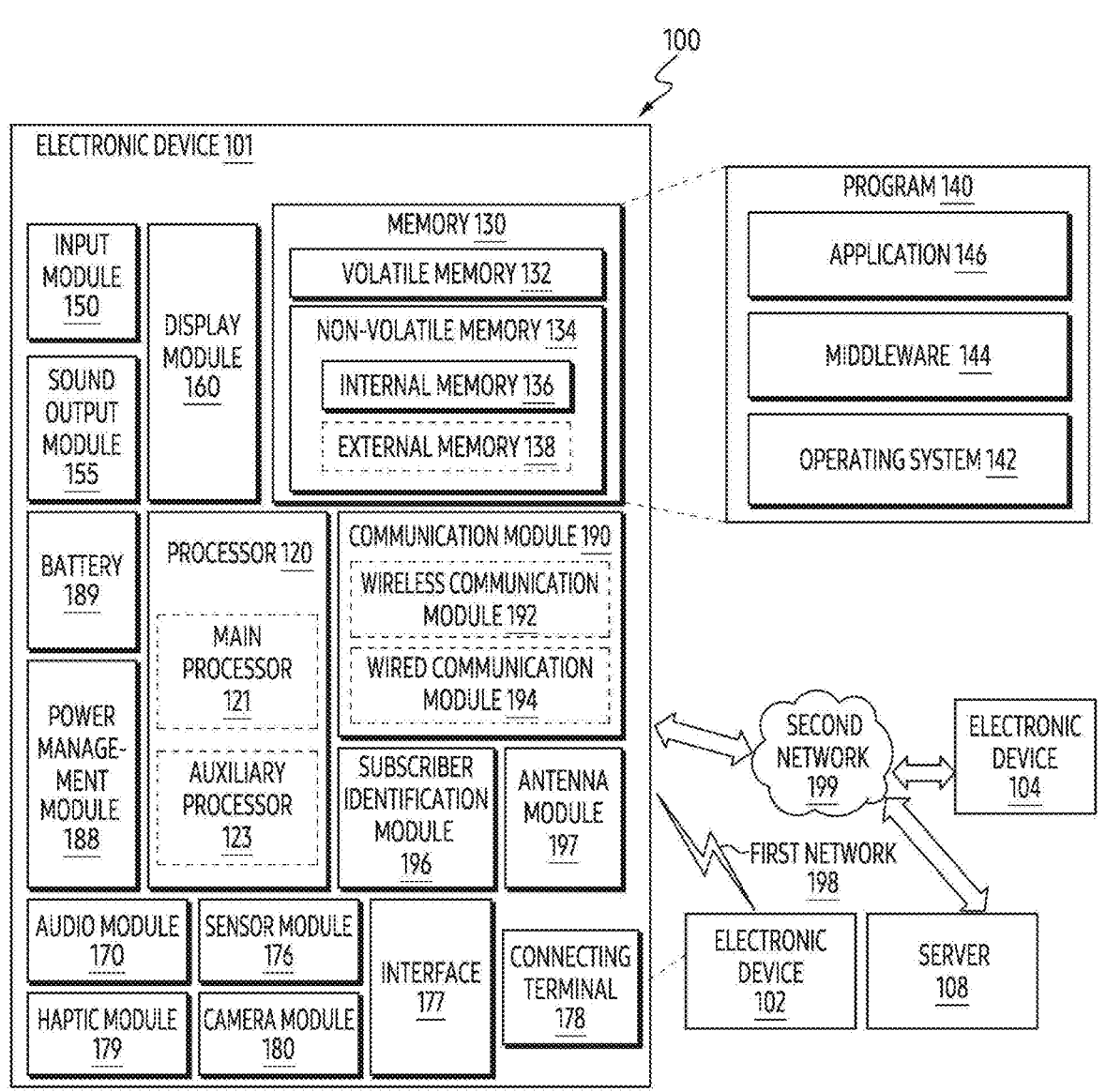
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application).

According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mm Wave band) to address, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another example, the external electronic device 104 may include an internet-of-things (IOT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
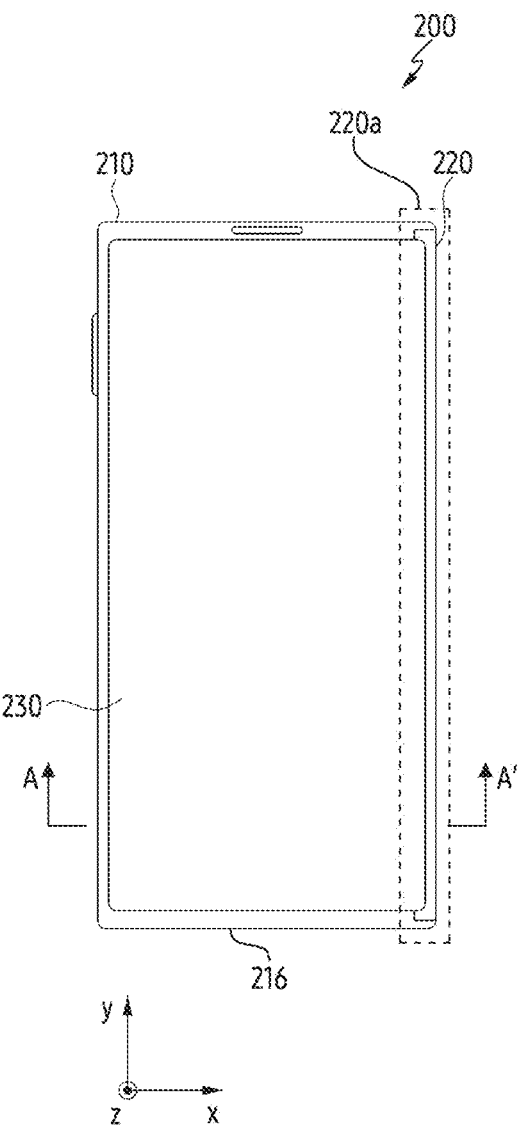
FIG. 2A is a diagram illustrating a front view of a first state of an electronic device according to various embodiments.
Figure 2B:
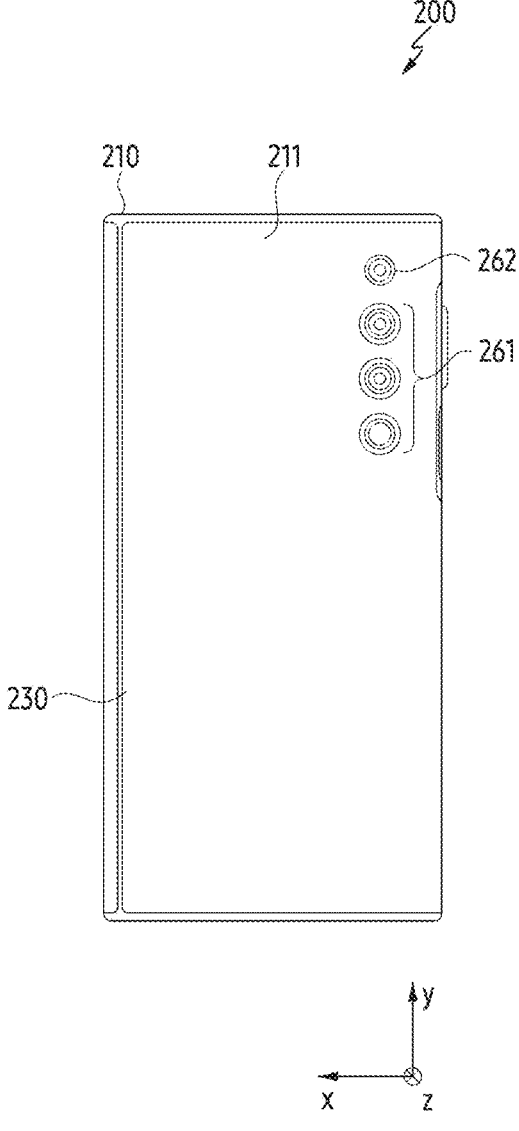
FIG. 2B is a diagram illustrating a rear view of a first state of an electronic device according to various embodiments.
Figure 3A:
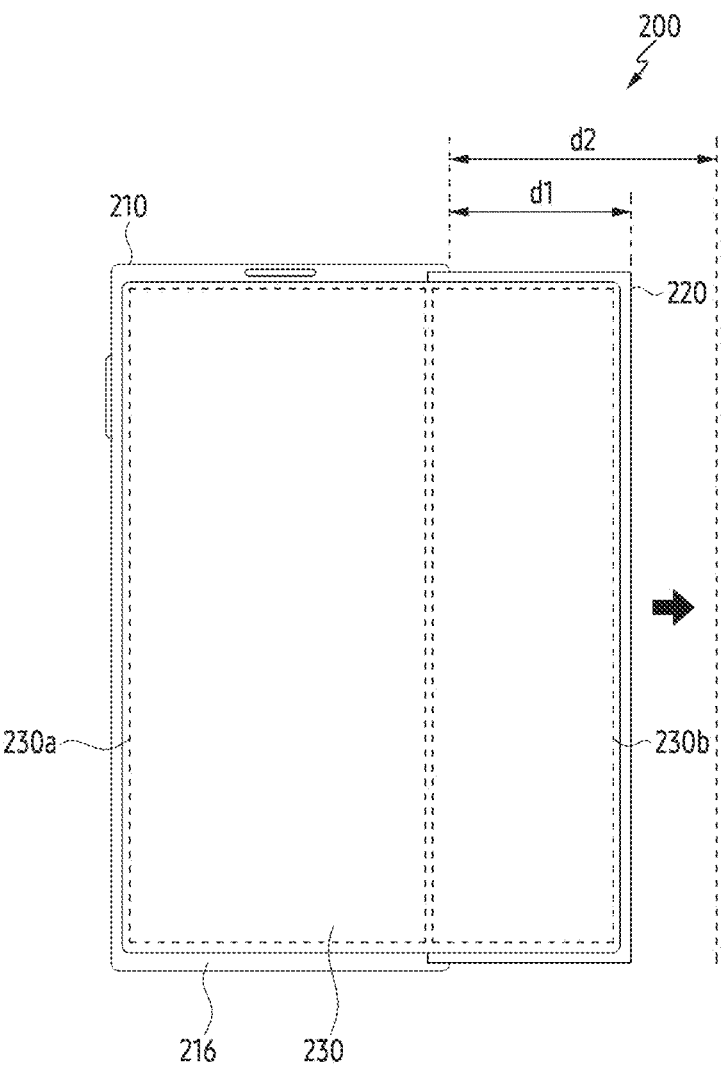
FIG. 3A is a diagram illustrating a front view of a second state of an electronic device according to various embodiments.
Figure 3A:
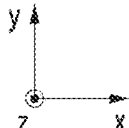
Figure 3B:
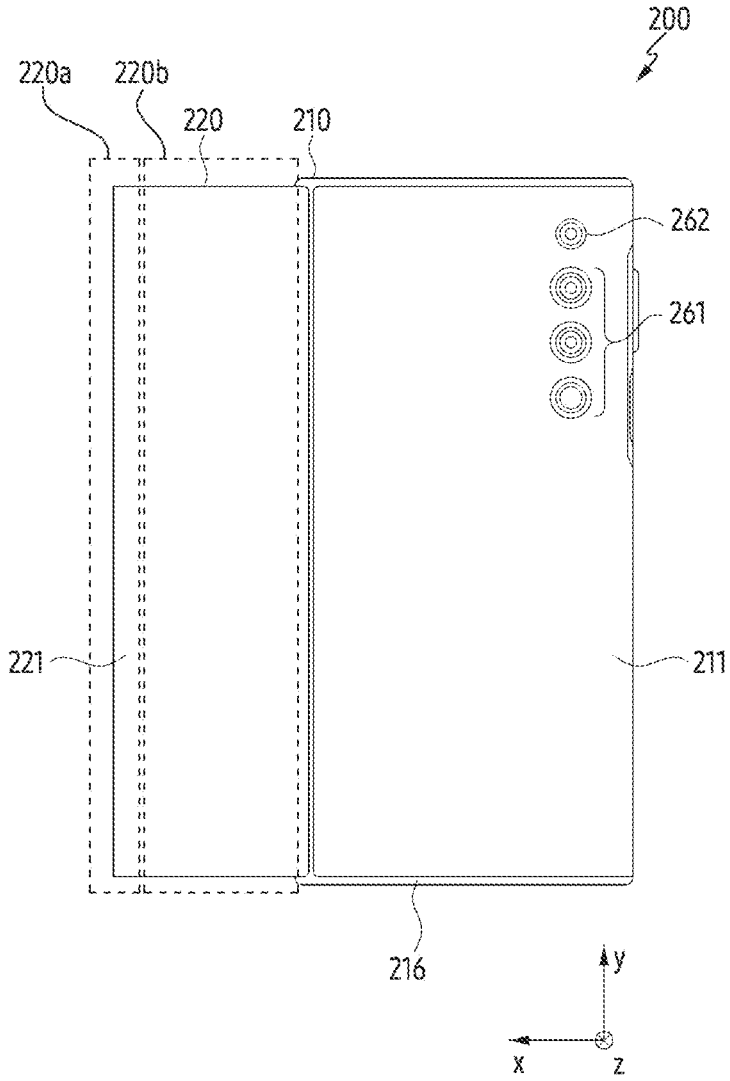
FIG. 3B is a diagram illustrating a rear view of a second state of an electronic device according to various embodiments.

FIG. 2A is a diagram illustrating a front view of a first state of an electronic device according to various embodiments. FIG. 2B is a diagram illustrating a rear view of a first state of an electronic device according to various embodiments. FIG. 3A is a diagram illustrating a front view of a second state of an electronic device according to various embodiments. FIG. 3B is a diagram illustrating a rear view of a second state of an electronic device according to various embodiments.

Referring to FIGS. 2A, 2B, 3A, and 3B, an electronic device 200 (e.g., the electronic device 101 of FIG. 1) according to an embodiment may include a first housing 210 and a second housing 220. According to an embodiment, the second housing 220 may move from the first housing 210 in a designated direction, for example, a first direction (+x direction). For example, the second housing 220 may slide from the first housing 210 by a designated distance in the first direction (+x direction). According to an embodiment, the second housing 220 may make a linear reciprocating motion within the designated distance in the first direction (+x direction) from a portion of the first housing 210.

In an embodiment, a state in which the second housing 220 is slid away from the first housing 210 in the first direction (+x direction) may be referred to as a second state (e.g., an extended state or a slide-out state) of the electronic device 200. In various embodiments of the disclosure, the second state of the electronic device 200 may be referred to as a state in which a second portion 230b of the display 230 is visible to the outside. Alternatively, the second state of the electronic device 200 may refer to as a state in which the second portion 230b of the display 230 is located outside the second housing 220. According to an embodiment, the second housing 220 may move from the first housing 210 in the first direction (+X direction) such that at least a portion of the second housing 220 and/or the second portion 230b of the display 230 may be pulled out, and a pull-out length d1 may be formed corresponding to the moved distance. According to an embodiment, the second housing 220 may make a reciprocating motion within a designated distance d2. According to an embodiment, the pull-out length d1 may have a length of about 0 to the designated distance d2. The display 230 may be referred to as a flexible display that may be changed according to the movement of the second housing 220.

In various embodiments of the disclosure, a state in which the second housing 220 slides in a direction of the first housing 210, for example, a second direction (−x direction) opposite to the first direction (+x direction), may be referred to as a first state (e.g., a contracted state or a slide-in state) of the electronic device 200. In an embodiment, the first state of the electronic device 200 may be referred to as a state in which the second portion 230b of the display 230 is not visible to the outside. Alternatively, the second state of the electronic device 200 may be referred to as a state in which the second portion 230b of the display 230 is located inside the second housing 220.

In various embodiments, the first state may be referred to as a first shape, and the second state may be referred to as a second shape. For example, the first shape may include a slide-in state, a normal state, a reduced state, or a closed state, and the second shape may include a slide-out state or an open state. Furthermore, in an embodiment, the electronic device 400 may form a third state (e.g., an intermediate state) that is a state between the first state and the second state. For example, the third state may be referred to as a third shape, and the third shape may include a free stop state.

In switching between the second state and/or the first state, the electronic device 200 according to various embodiments of the disclosure may be manually switched by a user's manipulation or may be automatically switched through a driving module (not shown) disposed inside the first housing 210 or the second housing 220. According to an embodiment, an operation of the driving module may be triggered based on a user input. According to an embodiment, the user input for triggering the operation of the driving module may include a touch input, a force touch input, and/or a gesture input through the display 230. In an embodiment, the user input for triggering the operation of the driving module may include a voice input or an input of a physical button exposed to the outside of the first housing 210 or the second housing 220. According to an embodiment, the driving module may be driven in a semi-automatic manner in which an operation is triggered when a manual operation by an external force from the user is detected.

According to an embodiment, the electronic device 200 may be referred to as a "slidable electronic device" as the second housing 220 is configured to slide, or may be referred to as a "rollable electronic device" as at least a portion of the display 230 is configured to be rolled up into the second housing 220 (or the first housing 210) based on sliding movement of the second housing 220.

According to an embodiment, the electronic device 200 may be configured such that the second housing 220 may be coupled to be at least partially slidable from the first housing 210. According to an embodiment, the coupling form of the first housing 210 and the second housing 220 is not limited to those illustrated in FIGS. 2A, 2B, 3A, and 3B, and may be implemented by a combination and/or coupling of other shapes or components.

According to an embodiment, the first housing 210 of the electronic device 200 may include a book cover 216 surrounding an inner space of the first housing 210 and a rear plate 211 surrounding a rear surface of the book cover 216. The second housing 220 of the electronic device 200 may include a slide cover 221 surrounding an inner space of the second housing 220.

According to an embodiment, the slide cover 221 may include a first cover area 220a of the slide cover 221 that is not inserted into the first housing 210 and is always visible to the outside in the second state and the first state of the electronic device 200, and a second cover area 220b that is inserted into or pulled-out from the inner space of the first housing 210. According to an embodiment, the second cover area 220b of the second housing 220 may not be visible to the outside in the first state, but may be visible to the outside in the second state.

According to an embodiment, the display 230 may be disposed to be visible to the outside in a front direction (e.g., +z direction) of each of the first housing 210 and the second housing 220. According to an embodiment, a display area of the display 230 may include a first portion 230a and a second portion 230b.

According to an embodiment, the first portion 230a of the display 230 may be a display area that is fixedly visible to the outside, regardless of whether the electronic device 200 is in the second state or the first state. For example, the first portion 230a of the display 230 may be fixed without movement regardless of the sliding movement of the second housing 220.

According to an embodiment, the second portion 230b of the display 230 may be a display area extending from one end of the first portion 230a, and may be inserted into the inner space of the second housing 220 or may be drawn out of the inner space of the second housing 220 in conjunction with the sliding movement of the second housing 220. According to an embodiment, a hole (not shown) through which the second portion 230b of the display 230 is drawn out or drawn in may be disposed to be adjacent to a side surface of the second housing 220 in the +x direction. For example, the second portion 230b of the display 230 may be drawn-out or drawn-in from a boundary portion of the second housing 220 in the +X direction.

According to an embodiment, in the second state, the second portion 230b of the display 230 may be drawn out from the inner space of the second housing 220 to the outside and may be visible to the outside. According to an embodiment, in the first state, the second portion 230b of the display 230 may be inserted into the inner space of the second housing 220 and may not be visible to the outside.

According to an embodiment, the display 230 may include a flexible display. The second portion 230b of the display 230 may be rolled into the inner space of the second housing 220 in the first state to be drawn-in in its bent state.

According to an embodiment, in the first state, the display area of only the first portion 230a of the display 230 may be visible to the outside. In the second state, the display area of the first portion 230a and the second portion 230b of the display 230 may be visible to the outside.

According to an embodiment, the electronic device 200 may include a camera module 261 and/or a flash 262. The camera module 261 and/or the flash 262 may be exposed through an opening formed in the rear plate 211. The camera module 261 may include a plurality of cameras. For example, the camera module 261 may include a wide-angle camera, an ultra-wide-angle camera, a telephoto camera, a proximity camera, and/or a depth camera. However, the camera module 261 is not necessarily limited to including a plurality of cameras, and may include one camera. According to an embodiment, the camera module 261 may include one or more lenses, an image sensor, and/or an image signal processor. According to an embodiment, the flash 262 may include, for example, a light emitting diode or a xenon lamp.

According to an embodiment, the electronic device 200 may include a sensor module (not shown) and/or a camera module (not shown) disposed under the display 230 (e.g., in −z direction from the display 230). The sensor module may detect an external environment based on information (e.g., light) received through the display 230. According to an embodiment, the sensor module may include at least one of a receiver, a proximity sensor, an ultrasonic sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, a motor encoder, or an indicator. According to an embodiment, at least some sensor module of the electronic device 200 may be visually exposed to the outside through a partial area of the display 230. According to an embodiment, the electronic device 200 may detect a pull-out length (e.g., length A) using the sensor module. According to an embodiment, the electronic device 200 may generate pulling-out information about a degree of pulling-out detected by the sensor. For example, the electronic device 200 may detect and/or identify the degree of pulling-out of the second housing 220 using the pulling-out information. According to an embodiment, the pulling-out information may include information on the pulled-out length of the second housing 220.

According to an embodiment, the electronic device 200 may include a housing (e.g., the first housing 210 and the second housing 220), and a display 230 supported by the housings 210 and 220, an area of the display area of the display 230 being adjusted in conjunction with movement of at least a portion of the housings 210 and 220 in the first direction. The display area of the display 230 may include a first portion 230a that is fixedly visible to the outside regardless of movement of at least the portion of the second housing 220 in the first direction, and a second portion 230b that extends from one end of the first portion 230a and is pulled out of the inner space of the first housing 210 in conjunction with movement of at least the portion of the second housing 220 in the first direction (+x direction) to be exposed to the outside.

Figure 4:
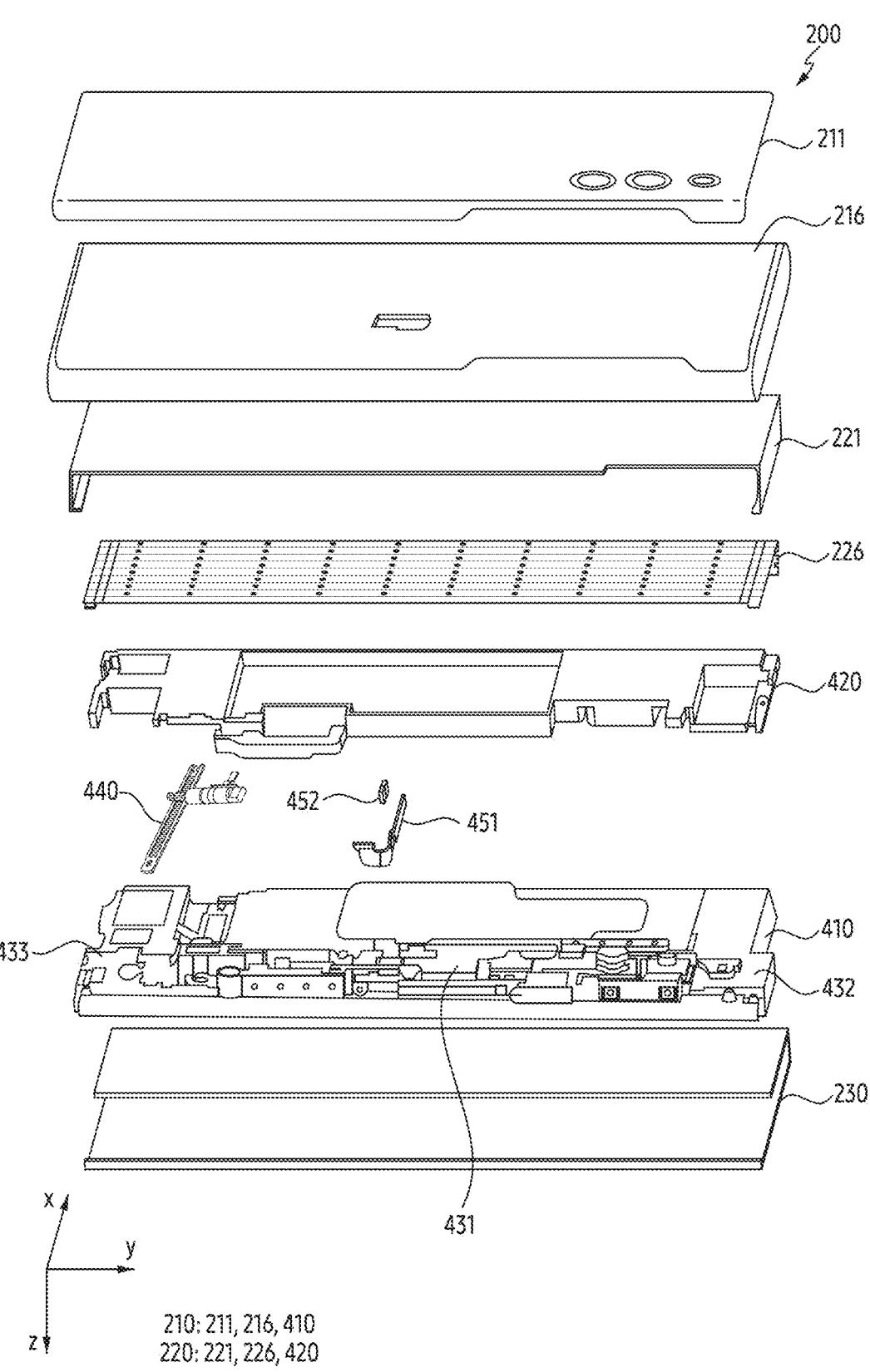
FIG. 4 is an exploded perspective view of an electronic device according to various embodiments.
Figure 5:
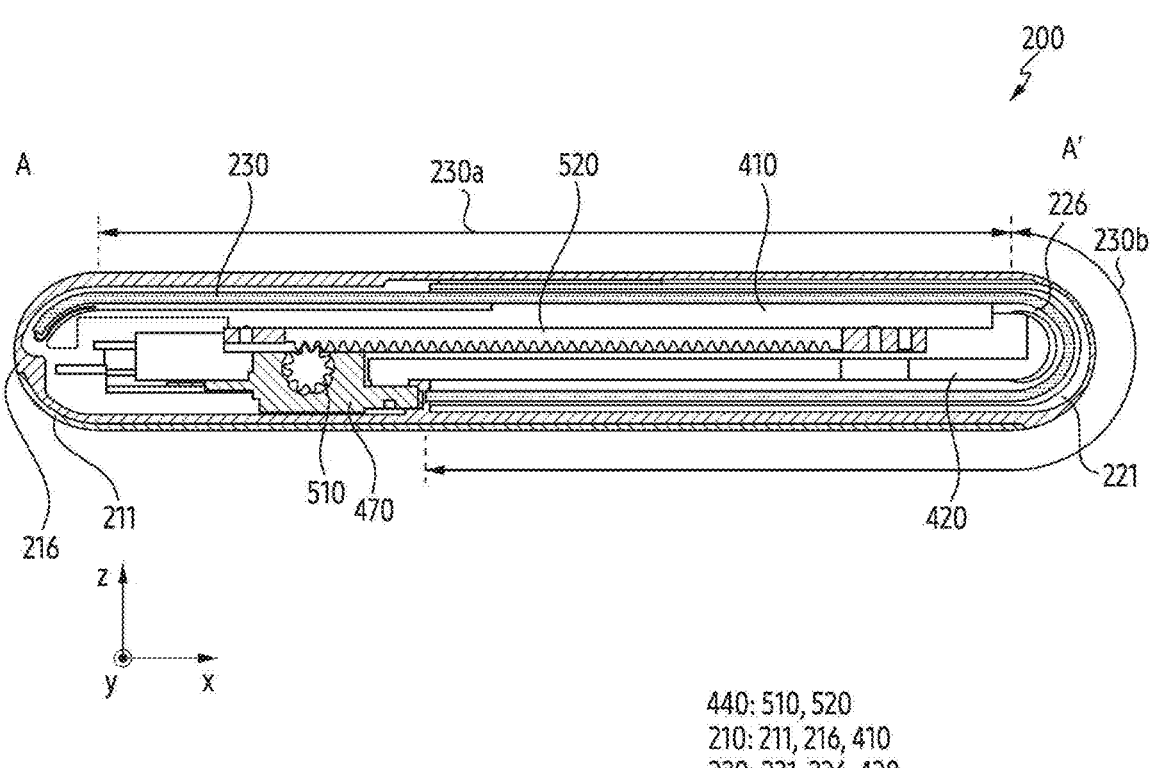
FIG. 5 is a cross-sectional view of an electronic device taken along line A-A' of FIG. 2A, according to various embodiments.

FIG. 4 is an exploded perspective view of an electronic device according to various embodiments. FIG. 5 is a cross-sectional view of an electronic device taken along line A-A' of FIG. 2A, according to various embodiments.

Referring to FIGS. 4 and 5, the electronic device 200 may include a first housing 210, a second housing 220, and a display 230.

In an embodiment, the first housing 210 may include a rear plate 211, a book cover 216, and/or a first support member 410. The book cover 216 may form a portion of the exterior of the electronic device 200, and the rear plate 211 may form a portion of the rear surface of the electronic device 200. The rear plate 211 may be disposed in a direction (e.g., −z direction) toward one surface of the book cover 216. The book cover 216 may form a side surface of the electronic device 200 and may provide a surface on which the rear plate 211 is to be seated.

According to an embodiment, the first support member 410 may extend inward from the book cover 216. For example, the first support member 410 may be surrounded by the book cover 216. The first support member 410 may be disposed between the display 230 and the book cover 216. For example, the book cover 216 may surround a space between the rear plate 211 and the first portion 230a of the display 230. The first support member 410 may extend from the book cover 216 within the space.

According to an embodiment, the first support member 410 may support or accommodate other components included in the electronic device 200. For example, the first portion 230a of the display 230 may be disposed on one surface of the first support member 410 facing one direction (e.g., the +z direction), and the first portion 230a of the display 230 may be supported by the first support member 410. As another example, a printed circuit boards (431, 432, 433), a driving unit assembly 440, a camera module 261, and a flash 262 may be disposed on another surface of the first support member 410 facing a direction (e.g., the −z direction) opposite to the one direction. The printed circuit boards (431, 432, 433), the driving unit assembly 440, the camera module 261, and the flash 262 may be seated in a recess defined by the first support member 410 or a hole defined by the rear plate 211, respectively.

According to an embodiment, the printed circuit boards (431, 432, 433) and the driving unit assembly 440 may be coupled to the first support member 410, respectively. For example, the printed circuit boards (431, 432, 433) may be fixed to the first support member 410 by means of a fastening member such as e.g., a screw. The rack gear of the driving unit assembly 440 may be fixed to the first support member 410 through the fastening member. However, such a fixing or coupling method is not limited to the above-described method.

According to an embodiment, the book cover 416 may be disposed between the first support member 410 and the rear plate 411. According to an embodiment, the book cover 416 may be disposed on the first support member 410. For example, the book cover 416 may be disposed on a surface of the first support member 410 facing the −z direction.

According to an embodiment, the book cover 416 may at least partially overlap the printed circuit boards (431, 432, 433) when viewed in the z-axis direction. The book cover 416 may cover at least a partial area of the printed circuit boards (431, 432, 433). The book cover 416 may protect the printed circuit boards (431, 432, 433) from physical impact. The book cover 416 may be coupled to the first support member 410 by means of the fastening member (e.g., a screw).

According to an embodiment, the second housing 220 may include a slide cover 221, a support bar 226, and/or a second support member 420. The slide cover 221 may form another part of the appearance of the electronic device 200. For example, the book cover 216 may form a part of the appearance of the electronic device 200, and the slide cover 221 may form another part the appearance of the electronic device 200. According to an embodiment, the second housing 220 may be slidably coupled to the first housing 210. For example, in the first state, the second cover area 220b of the second housing 220 may be within the first housing 210. In the second state, the first cover area 210b of the second housing 220 may move in the first direction (+x direction) to be exposed to the outside of the first housing 210.

According to an embodiment, the support bar 226 may support the second portion 230b of the display 230 when the display 230 is expanded to the second state. For example, the support bar 226 may be coupled by a plurality of bars to be formed in a shape corresponding to the shape of the second portion 230b of the display 230. According to an embodiment, in the first state in which the second portion 230b of the display 230 is wound within the second housing 220, the support bar 226 may be wound within the second housing 220 along with the second portion 230b of the display 230. The support bar 226 may move along a guide rail formed on an inner surface of the slide cover 221. As the support bar 226 moves into the slide cover 221, the second portion 230b of the display 230 may be rolled up into the slide cover 221.

According to an embodiment, the second portion 230b of the display 230 may be pulled out of the inner space of the second housing 220 in the second state. For example, as the support bar 226 moves from the inner space of the slide cover 221 to the outside along the guide rail formed on the inner surface of the slide cover 221, the second portion 230b of the display 230 may be drawn out from the inner space of the slide cover 221 to the outside thereof.

According to an embodiment, the second support member 420 may extend inward from the slide cover 221. For example, the second support member 420 may be surrounded by the slide cover 221 and the second portion 230b of the display 230. The second support member 420 may move in the first direction (+x direction) when the display 230 is expanded. For example, in the first state, the second support member 420 may be disposed under the first portion 230*a* of the display 230 or the first support member 410 (e.g., −z direction with respect to the display 230). In the second state, the second support member 420 may move in the first direction (+x direction) and may be disposed under the second portion 230*b* of the display 230. The second support member 420 may surround a space between the slide cover 221 and the display 230. The second support member 420 may extend from the slide cover 221 within the space.

According to an embodiment, the second support member 420 may support or accommodate other components included in the electronic device 200. The second support member 420 may support the support bar 226. The support bar 226 may be supported by the second support member 420 while moving along the inner surface of the slide cover 221 to maintain the shape of the second portion 230*b* of the display 230. The second support member 420 may be coupled to a driving unit of the driving unit assembly 440 or a case 470 surrounding the driving unit. For example, the case 470 or the driving unit may be fixed to the second support member 420 by means of the fastening member such as a screw. However, the fixing or fastening method is not limited to the above-described method.

According to an embodiment, the driving unit of the driving unit assembly 440 or the case 470 may be fixed to the second support member 420, and the rack gear 520 may be fixed to the second support member 420. When the pinion gear 510 rotates by driving of the driving unit assembly 440, the rack gear 520 engaged with the pinion gear may move in the first direction (+x direction) or the second direction (−x direction).

According to an embodiment, in the first state, when the pinion gear 510 rotates counterclockwise on the basis of FIG. 5 by the operation of the driving unit assembly 440, the rack gear 520 may extend from the driving unit assembly 440 or the case 470 in the second direction (−x direction). The driving unit assembly 440 or the case 470 may move in the first direction (+x direction) by extending of the rack gear 520 in the second direction. The second housing 220 coupled to the driving unit or the case 470 of the driving unit assembly 440 may move in the first direction (+x direction) by the movement of the driving unit assembly 440.

In the second state, when the pinion gear 510 is rotated clockwise with reference to FIG. 5 by the operation of the driving unit assembly 440, the rack gear 520 may move in the first direction (+x direction). When the rack gear 520 moves in the first direction (+x direction) to be inserted into the second housing 220, the driving unit assembly 440 or the case 470 may move in the second direction (−x direction). The second housing 220 coupled to the driving unit or the case 470 of the driving unit assembly 440 may move in the second direction (−x direction) by the movement of the driving unit assembly 440.

Heretofore, it has been described that the rack gear 520 is fixed to the first support member 410 and the driving unit of the driving unit assembly 440 is fixed to the second support member 420, but the disclosure is not limited thereto. The rack gear 520 may be fixed to the second support member 420, and the driving unit or the case 470 of the driving unit assembly 440 may be fixed to the first support member 410. For example, as the rack gear 520 moves by the operation of the driving unit, the second support member 420 coupled to the rack gear 520 may move.

According to an embodiment, the electronic device 200 may further include a flexible printed circuit board 451 including a Hall sensor and a magnet 452. The magnet 452 may be disposed on the second support member 420, and the flexible printed circuit board 451 may be disposed on the first support member 410. The Hall sensor disposed on the flexible printed circuit board 451 may detect magnitude and direction of a magnetic force supplied from the magnet 452, as the second support member 420 moves. Based on the magnitude and direction of the magnetic force detected using the Hall sensor disposed on the flexible printed circuit board 451, the processor (e.g., the processor 120 of FIG. 1) may detect a movement distance and/or a movement direction of the second support member 420. While it has been described that the flexible printed circuit board 451 has one hall sensor, the flexible printed circuit board 451 may include a plurality of hall sensors. Based on the data obtained through each of the plurality of hall sensors, the processor 120 may detect the position, movement distance, and/or movement direction of the second support member 420 more accurately than when a single hall sensor is used.

According to an embodiment, the electronic device 200 may include a first support member 410, a second support member 420 slidably coupled to the first support member 410 in the first direction, a display disposed on a surface formed by the first support member 410 and the second support member 420, the display being expanded in the first direction (+x direction) or reduced in the second direction (−x direction) according to the movement of the second support member 420, a rack gear 520 connected to the first support member 410, a pinion gear 510 including a plurality of teeth engaged with the rack gear 520, a driving unit configured to rotate the pinion gear 510, and a case 470 surrounding a portion of the driving unit and the pinion gear and disposed on the second support member.

The electronic device 200 according to an embodiment may have guides arranged for preventing the second support member 420 from being twisted or inclined (e.g., tilting), when the second support member 420 moves from the first support member 410. For example, when the second support member 420 moves in the first direction (+x direction), if there is no mechanism for preventing tilting, the second support member 420 may be inclined with respect to the first support member 410. In case where the first support member 410 and the second support member 420 have an inclination, the display 230 supported by the first support member 410 and the second support member 420 may be bent. Placing a separate structure on the second support member 420 for preventing such a tilting due to the movement of the second support member 420 may result in a lack of a mounting space inside the electronic device 200.

Hereinafter, description will be made of a structure for preventing the second support member 420 from being inclined with respect to the first support member 410 while securing a mounting space inside the electronic device 200.

Figure 6A:
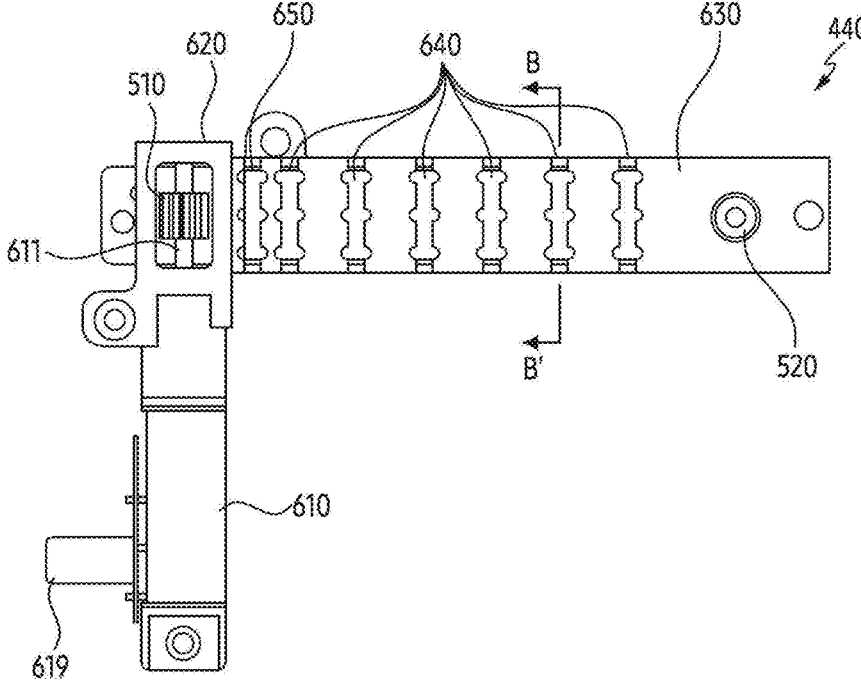
FIG. 6A is a diagram illustrating an example driving unit assembly of an electronic device according to various embodiments.
Figure 6A:
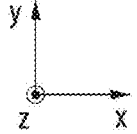
Figure 6B:
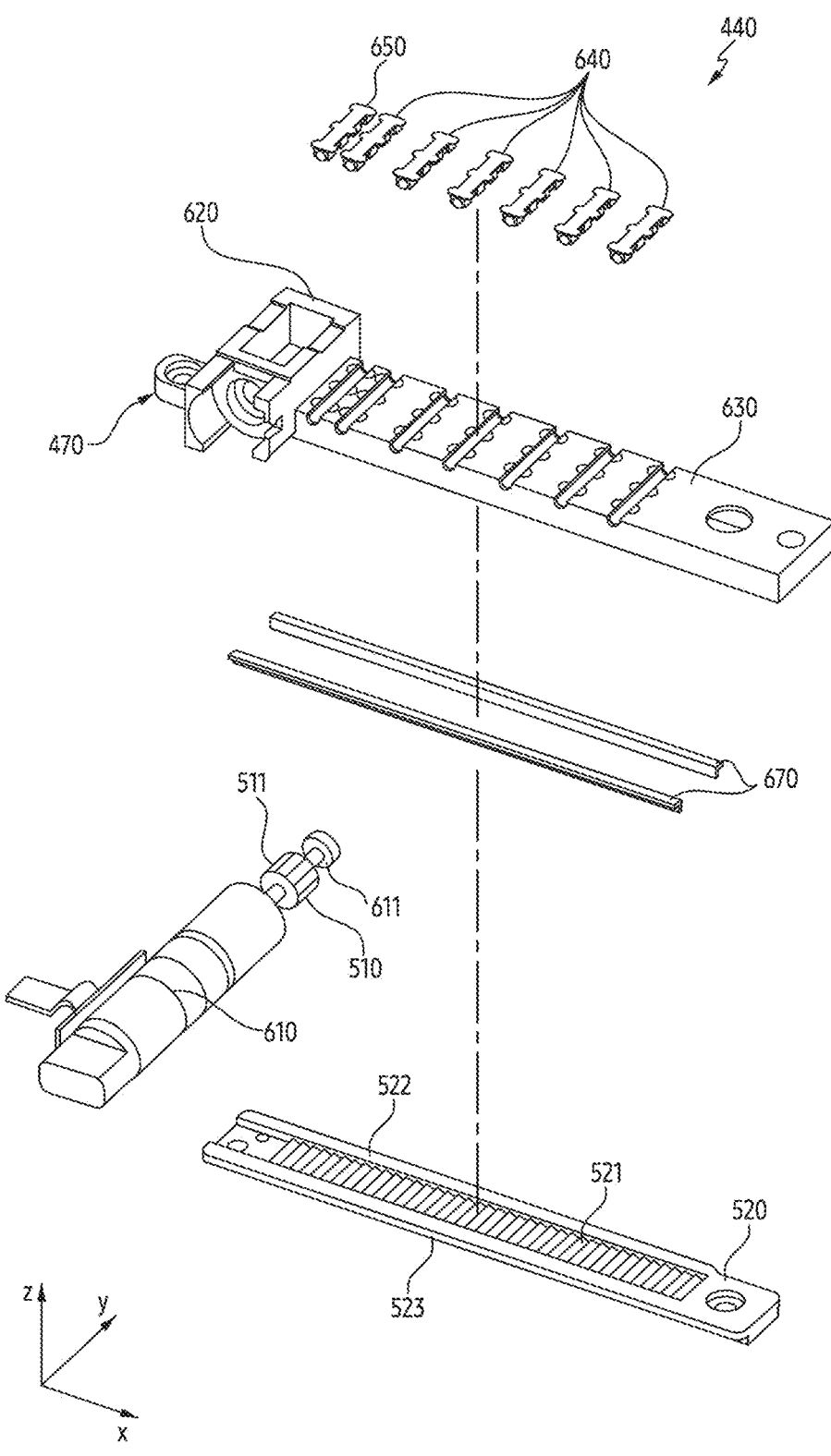
FIG. 6B is an exploded perspective view of a driving unit assembly according to various embodiments.

FIG. 6A is a diagram illustrating an example driving unit assembly of an electronic device according to various embodiments. FIG. 6B is an exploded perspective view of a driving unit assembly according to various embodiments.

Referring to FIGS. 6A and 6B, the driving unit assembly 440 may include a driving unit 610, a pinion gear 510, a rack gear 520, a bracket 620, and a rack gear case 630. The bracket 620 may be referred to as a driving unit case surrounding at least a portion of the driving unit 610.

According to an embodiment, the bracket 620 may be configured to surround a portion of the driving unit 610 and the pinion gear 510, and may be disposed on the second support member 420 (e.g., the second support member 420 of FIG. 4). The bracket 620 may accommodate the driving unit 610, a shaft 611 of the driving unit 610, the pinion gear 510 connected to the shaft 611, and a portion of the rack gear 520 engaged with the pinion gear 510. The bracket 620 may support components making up the driving unit assembly 440. The bracket 620 may be coupled to the second support member 420 of the electronic device 200 (e.g., the electronic device 200 of FIG. 2A).

According to an embodiment, the rack gear case 630 may extend from one side surface of the bracket 620. For example, the rack gear case 630 may extend from the bracket 620 along the rack gear 520. The rack gear case 630 may surround the rack gear 520. For example, the rack gear case 630 may surround one surface of the rack gear 520 on which a plurality of teeth are disposed and a side surface disposed along a periphery of the one surface of the rack gear 520. According to an embodiment, the rack gear case 630 may have a groove corresponding to the shape of the rack gear 520. The rack gear case 630 may guide the rack gear 520 to make a linear reciprocating motion in the first direction. According to an embodiment, the bracket 620 and the rack gear case 630 may be a case 601 integrally formed with each other. The case 601 and the driving unit 610 may be coupled to a second support member (e.g., the second support member 420 of FIG. 4).

According to an embodiment, the driving unit 610 may occupy an inner space of the bracket 620. The driving unit 610 may be seated on the bracket 620 and disposed in the electronic device 200. For example, as the bracket 620 is coupled to the second support member 420, the driving unit 610 may be supported by the second support member 420 and the bracket 620.

According to an embodiment, the driving unit 610 may be electrically connected to a printed circuit board (e.g., the printed circuit boards (431, 432, 433) of FIG. 4) through a flexible printed circuit board 619. The driving unit 610 may receive power and a control signal through the flexible printed circuit board 619. The driving unit 610 may be supplied with electrical energy through the flexible printed circuit board 619 and provide rotational energy to the shaft 611. The shaft 611 may rotate with the rotational energy converted by the driving unit 610. The bracket 620 may include a through hole through which the shaft 611 may pass. The shaft 611 may be rotatably supported by the bracket 620.

According to an embodiment, the pinion gear 510 may be rotatably coupled to the shaft 611. The shaft 611 may penetrate the pinion gear 510. A rotation axis of the shaft 611 and a driving axis of the driving unit 610 may pass through the center of the pinion gear 510. As the pinion gear 510 is coupled to the shaft 611, the pinion gear 510 may rotate by a rotational force transmitted to the shaft 611. The pinion gear 510 may receive power generated from the driving unit 610 through the shaft 611.

According to an embodiment, the rack gear 520 may be engaged with the pinion gear 510. The rack gear 520 may include gear teeth 521 corresponding to the teeth 511 of the pinion gear 510. The teeth 511 of the pinion gear 510 may be disposed at intervals along an outer circumferential surface of the pinion gear 510. The teeth 521 of the rack gear 520 may be disposed on one surface of the rack gear 520. The teeth 521 of the rack gear 520 may be engaged with the teeth 511 of the pinion gear 510. The rack gear 520 may move in a direction perpendicular to the rotation axis of the pinion gear 510 by rotation of the pinion gear 510. The driving unit assembly 440 may convert a rotational motion into a linear motion by means of the pinion gear 510 and the rack gear 520. The rack gear 520 may be secured to the first support member 410, and the movement of the rack gear 520 may allow the second support member 420 coupled to the driving unit 610 and the case 601 to move in a linear motion.

According to an embodiment, the rack gear 520 may move along the interior of the rack gear case 630. The rack gear case 630 may maintain the movement direction of the rack gear 520 to be parallel to the first direction (+x direction) or the second direction (−x direction), while guiding the movement of the rack gear 520. The rack gear 520 and the rack gear case 630 may be made of a metal material. Since the rack gear 520 moves in contact with the rack gear case 630, a frictional force between the rack gear 520 and the rack gear case 630 may increase. In order to reduce the frictional force between the rack gear 520 and the rack gear case 630 and prevent wear, the driving unit assembly 440 may include bearing assemblies (640, 650) and a protective member 670. The rack gear case 630 for guiding the rack gear 520 to make a linear reciprocating motion in the first direction (+x direction) may include a plurality of bearings disposed on one surface of the rack gear case 630 facing the gear teeth of the rack gear 520. For example, the bearing assemblies (640, 650) may be disposed in the rack gear case 630 at intervals. In the first state, the plurality of bearings of the bearing assemblies (640, 650) may be in contact with one surface of the rack gear 520 on which a plurality of gear teeth are formed. The bearing assemblies (640, 650) may guide the rack gear 520 to linearly reciprocate in the first direction (+x direction). The protective member 670 may be disposed between a side surface 523 of the rack gear 520 and the rack gear case 630. The bearing assemblies (640, 650) may make a line contact or a point contact with a first surface 522 of the rack gear 520, thereby reducing the frictional force. The bearing included in the bearing assemblies (640, 650) is caused to rotate or move, and thus the bearing assemblies (640, 650) may reduce the frictional force between the rack gear 520 and the rack gear case 630 and may reduce wear of the rack gear 520. The protective member 670 may include an elastic foam material or a rubber material. When the rack gear 520 moves, the protective member 670 having elasticity may reduce the wear of the rack gear 520 due to the frictional force between the side surface 523 of the rack gear 520 and the rack gear case 630.

According to an embodiment, the driving unit assembly 440 may include the rack gear case 630 supporting the rack gear 520, and therefore, may prevent the rack gear 520 from being tilted in the third direction (z-axis direction) perpendicular to the first direction (x-axis direction), when it moves in the first direction (x-axis direction) or the second direction (−x-axis direction) of the rack gear 520. The rack gear case 630 may be in contact with the rack gear 520 to prevent the rack gear 520 from being tilted. In order to prevent the rack gear 520 from being worn by the rack gear case 630 in contact with the rack gear 520, the driving unit assembly 440 may include the bearing assemblies (640, 650) and the protective member 670. The rack gear 520 may reduce the frictional force with the rack gear case 630 owing to the bearing assemblies (640, 650) and the protective member 670. The bearing assemblies (640, 650) and the protective member 670 may increase the lifespan of the rack gear 520 and the rack gear case 630, thereby increasing the durability of the driving unit assembly 440.

According to an embodiment, the driving unit assembly 440 may provide a rack gear case 630. The rack gear case 630 may be disposed to be in contact with the rack gear 520 to prevent tilting of the rack gear 520. The rack gear case 630 may prevent tilting of the rack gear 520, thereby preventing tilting of the first support member 410 connected to the rack gear 520 and the second support member 420 connected to the case 470 of the driving unit assembly 440. The rack gear case 630 and the rack gear 520 may be made of a metal material, which may cause wear due to friction with each other. According to an embodiment, the bearing assemblies (640, 650) may be disposed in the driving unit assembly 440. The bearing assemblies (640, 650) may reduce friction between the rack gear case 630 and the rack gear 520.

Figure 7:
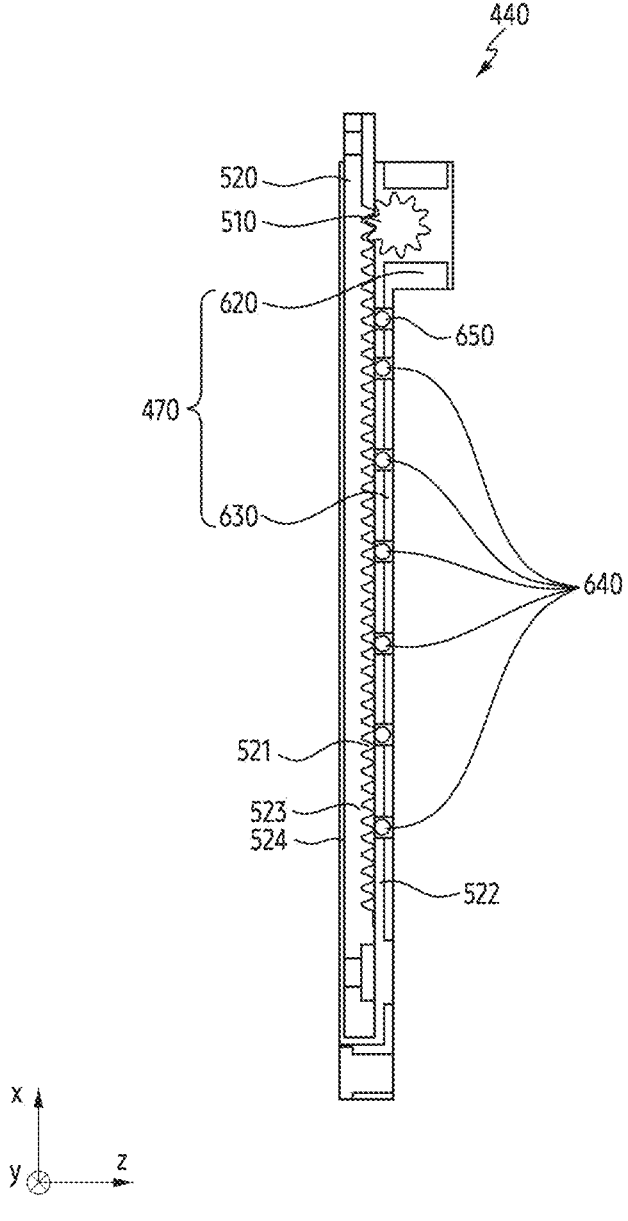
FIG. 7 is a diagram illustrating an arrangement of a rack gear and a rack gear case in a first state according to various embodiments.
Figure 8:
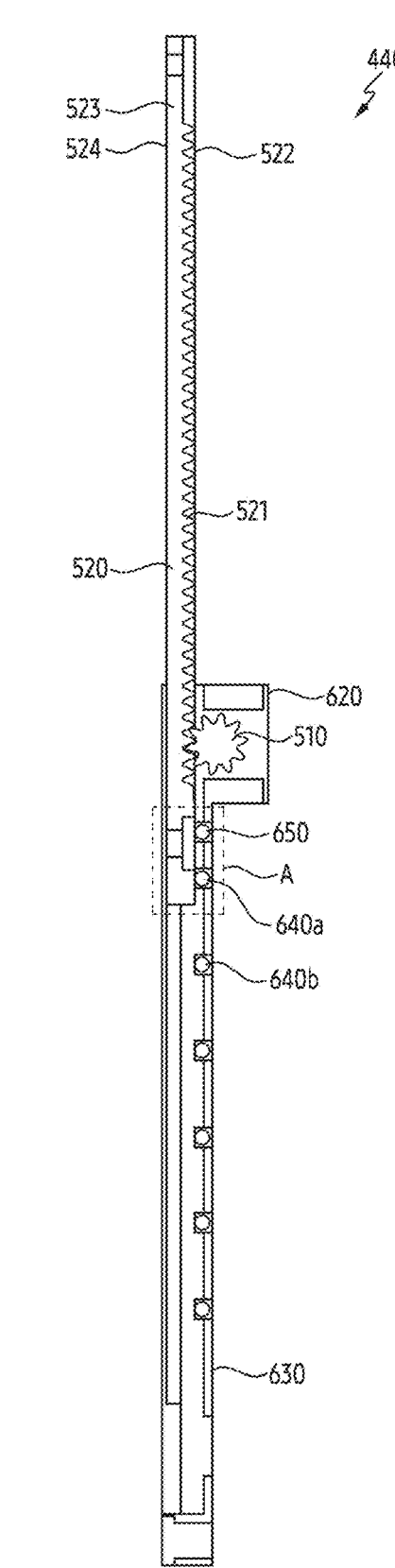
FIG. 8 is a diagram illustrating an arrangement of a rack gear and a rack gear case in a second state according to various embodiments.

FIG. 7 is a diagram illustrating an arrangement of a rack gear and an extension case in the first state according to various embodiments. FIG. 8 is a diagram illustrating an arrangement of a rack gear and an extension case in a second state according to various embodiments.

Referring to FIGS. 7 and 8, the driving unit assembly 440 may include a bracket 620, and a rack gear case 630, the rack gear case 630 surrounding a first surface 522 of a rack gear extending from a side surface of the bracket 620 along the rack gear 520, on which a plurality of teeth are disposed, a portion of a second surface 524 of the rack gear 520 opposite to the first surface 522, and a side surface 523 of the rack gear 520. In the first state in which the second support member (e.g., the second support member 420 of FIG. 4) is movable in the first direction (+x direction) of the first direction (+x direction) and the second direction (−x direction), the plurality of teeth 521 may be surrounded by the rack gear case 630 and the bracket 620, and in the second state in which the second support member 420 is movable in the second direction (−x direction), some of the plurality of teeth 521 may be exposed from the rack gear case 630 and the bracket 620.

According to an embodiment, in the first state, the rack gear case 630 that guides the rack gear 520 to make a linear reciprocating motion in the first direction (+x direction) may include a plurality of bearings disposed on the first surface 522 of the rack gear case 630 facing the gear teeth 521 of the rack gear 520. In the first state, the gear teeth 521 of the rack gear 520 may be covered by the rack gear case 630 and the bracket 620. When the rack gear 520 moves in the first direction (+x direction) or the second direction (−x direction), a plurality of bearing assemblies (640, 650) may be disposed between the rack gear 520 and the rack gear case 630 to reduce friction between the rack gear 520 and the rack gear case 630. In the first state, a first set 640 of bearing assemblies may be disposed between the rack gear 520 and the rack gear case 630. In the second state, some of the plurality of bearing assemblies (640, 650) may overlap the rack gear 520.

According to an embodiment, an area of the first surface, in the first state, on which the gear teeth 521 of the rack gear 520 surrounded by the rack gear case 630 and the bracket 620 are disposed may be larger than an area of the first surface, in the second state, on which the gear teeth 521 of the rack gear 520 surrounded by the rack gear case 630 and the bracket 620 are disposed.

According to an embodiment, the bearings included in the plurality of bearing assemblies (640, 650) may be spaced apart from each other by a first distance along the first direction, and a second distance between one of the plurality of bearings included in a set 640 of first bearing assemblies, which is close to a second bearing assembly 650, and the bearing included in the second bearing assembly 650 may be less than the first distance. The plurality of bearing assemblies may include the set 640 of the first bearing assemblies and the second bearing assembly 650. The bearing assembly making up the set 640 of the first bearing assemblies may be disposed at a specified first interval. The second bearing assembly 650 may be disposed at the second distance different from the first distance from the first bearing assembly, which is positioned closer to the pinion gear 510, among the set 640 of the first bearing assemblies. According to an embodiment, the first distance may be greater than or equal to the second distance. For example, the first bearings included in the first bearing assemblies may be disposed at the first distance, and the second bearing of the second bearing assembly 650 may be disposed at the second distance.

Referring to FIG. 7, in the first state, the bearings of both the set 640 of the first bearing assemblies and the second bearing assembly 650 may be arranged to be in contact with the first surface 522 of the rack gear 520.

Referring to FIG. 8, in the second state, the rack gear 520 may be maximally withdrawn from the rack gear case 630 in the first direction (+x direction). The state in which the rack gear 520 is maximally withdrawn may be a state in which the rack gear 520 may no longer move in the first direction (+x direction) and may move in the second direction (−x direction).

According to an embodiment, in the second state, the first surface 522 of the rack gear 520 may be in contact with a first bearing assembly 640a, which is close to the pinion gear 510, among the bearing assemblies of the set 640 of the first bearing assemblies, and the second bearing assembly 650. For example, in the second state, the bearing of the first bearing assembly 640a, positioned close to the driving unit (e.g., the driving unit 610 of FIG. 6A), among the bearings included in the set 640 of the first bearing assemblies, and the bearing of the second bearing assembly 650 may be in contact with the first surface 522 of the rack gear on which a plurality of gear teeth 521 are formed. As the rack gear 520 moves, a third bearing assembly 640b disposed in an area corresponding to the distance d2, which is the maximum pull-out distance of the rack gear 520, may not come into contact with rack gear 520.

According to an embodiment, in the second state, when the second bearing assembly 650 is not disposed in the rack gear case 630, only one first bearing assembly 640a positioned close to the pinion gear 510 may support the rack gear 520. When the rack gear 520 is supported by a single first bearing assembly 640a, the rack gear may be inclined in the −z direction. For example, as the rack gear 520 is in line contact with the first bearing assembly 640a, the rack gear 520 positioned in the first direction (+x direction) with respect to the first bearing assembly 640a may be tilted in the −z-axis direction due to the self-weight of the rack gear 520. In order to prevent the rack gear 520 from being tilted, the second bearing assembly 650 may be further disposed in the rack gear case 630. For example, in an area A, the first bearing assembly 640a of the set 640 of the first bearing assemblies and the second bearing assembly 650 may be disposed. In the area A, the rack gear 520 may be supported by the first bearing assembly 640a and the second bearing assembly 650. The rack gear 520 may prevent its tilting in either−z direction or +z direction with a plurality of support points. According to an embodiment, it has been described that the second bearing assembly 650 is spaced apart from the first bearing assembly 640a in the +x direction, but the second bearing assembly 650 may be spaced apart from the first bearing assembly 640a in the −x direction. For example, when the maximum movement distance of the rack gear 520 is less than the distance d2, the second bearing assembly 650 may be disposed between the first bearing assembly 640*a* and the third bearing assembly 640*b*.

According to an embodiment, in the first state in which the second support member (e.g., the second support member 420 of FIG. 4) is movable in the first direction (+x direction) of the first direction (+x direction) and the second direction (−x direction) opposite to the first direction (+x direction), the plurality of teeth 521 may be surrounded by the rack gear case 630 and the bracket 620, and in the second state in which the second support member 420 is movable in the second direction (−x direction), some of the plurality of teeth 521 may be exposed to the outside of the rack gear case 630 and the bracket 620.

According to an embodiment, bearing assemblies (640, 650) may be arranged in the driving unit assembly 440. The bearing assemblies (640, 650) may reduce friction between the rack gear case 630 and the rack gear 520. At least two of the bearings making up the bearing assemblies (640, 650) may be arranged to be in contact with the rack gear 520. The plurality of bearings in contact with the rack gear 520 may prevent the rack gear 520 from being tilted with respect to the rack gear case 630 and the bracket 620.

Figure 9:
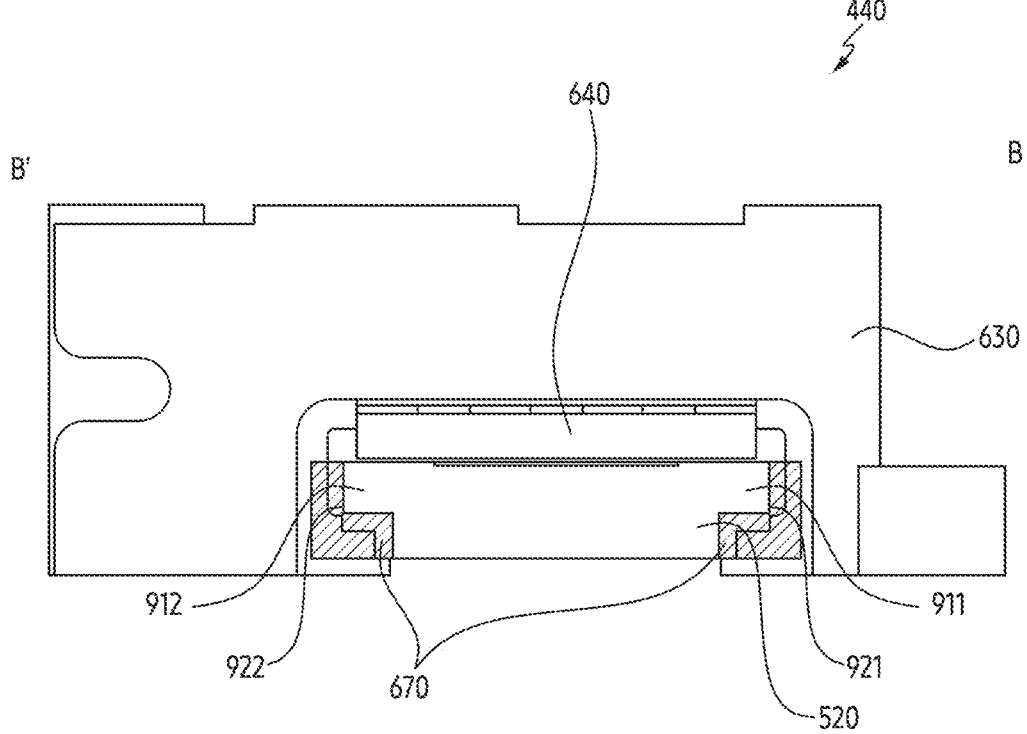
FIG. 9 is a cross-sectional view of a driving unit assembly taken along line B-B' of FIG. 7 according to various embodiments.

FIG. 9 is a cross-sectional view of the driving unit assembly taken along line B-B' of FIG. 7 according to various embodiments.

Referring to FIG. 9, the driving unit assembly 440 may include the rack gear case 630, the set 640 of first bearing assemblies, and/or a protective member 670. The rack gear case 630 may be disposed to surround the entire surface of the rack gear 520 to prevent the rack gear 520 from being tilted. To bring an inner surface of the rack gear case 630 into contact with the rack gear 520, the rack gear case 630 may include the set 640 of first bearing assemblies and the protective member 670. The rack gear 520 may have protrusions 911 and 912 formed on both side surfaces thereof to be inserted into a portion of the rack gear case. The protrusions 911 and 912 may extend from both side surfaces of the rack gear 520 toward the inner surface of the rack gear case 630. The protrusions 911 and 912 may protrude from portions of both the side surfaces. The rack gear case 630 may include coupling grooves 921 and 922 into which the protrusions of the rack gear are inserted, respectively. The shape of the coupling grooves 921 and 922 may correspond to the shape of the protrusions 911 and 912. The coupling grooves 921 and 922 may correspond to protruding shapes of the protrusions 911 and 912 and may surround at least portions of the protrusions 911 and 912.

According to an embodiment, to reduce friction between the rack gear 520 and the rack gear case 630, each of the coupling grooves 921 and 922 of the rack gear case 630 may include the protective member 670 having a foam material, disposed at a portion in contact with the rack gear 520.

The set 640 of the first bearing assemblies may be disposed to contact an upper surface of the rack gear 520. The protective member 670 may be disposed to surround a side surface of the rack gear 520. The set 640 of the first bearing assemblies may include any one of a needle bearing, a roller bearing, a ball bearing, a magnetic bearing, or a fluid bearing in contact with the rack gear 520. The protective member 670 may include an elastic material in contact with the side surface of the rack gear 520. The protective member 670 may include rubber, a foam material, or urethane. The protective member 670 is not limited to such an elastic material and may include a ball bearing. The protective member 670 may include a ball bearing disposed along the first direction (+x direction or an extended direction of the rack gear 520).

The driving unit assembly 440 according to an embodiment may further include the protective member 670 to reduce friction. The protective member 670 disposed between the rack gear case 630 and the rack gear 520 may reduce wear of the rack gear case 630 and the rack gear 520 by reducing direct contact between the rack gear case 630 and the rack gear 520.

Figure 10:
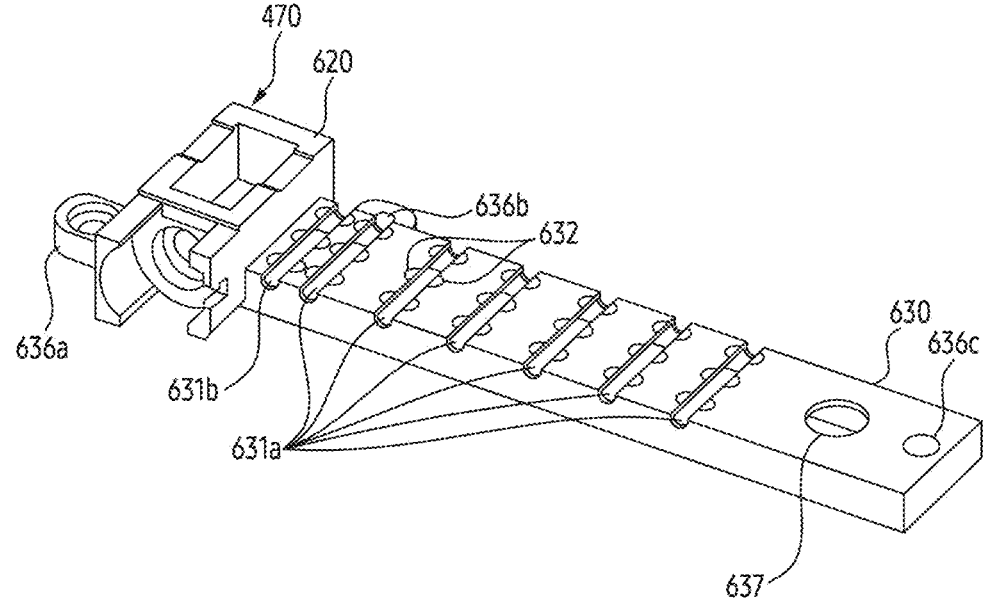
FIG. 10 is a perspective view illustrating an example rack gear case according to various embodiments.

FIG. 10 is a perspective view illustrating an extension case of the driving unit assembly according to various embodiments.

Referring to FIG. 10, the case 470 may include a bracket 620 and an extension case 630. The bracket 620 may accommodate a portion of the driving unit (e.g., the driving unit 610 of FIG. 6A), a driving unit shaft (e.g., the driving unit shaft 611 of FIG. 6A), a pinion gear (e.g., the pinion gear 510 of FIG. 6A), and a portion of a rack gear (e.g., the rack gear 520 of FIG. 6A). The extension case 630 may accommodate the remaining portion of the rack gear 520.

According to an embodiment, the case 470 may include openings (631*a*, 631*b*) for disposing bearing assemblies (e.g., the set 640 of the first bearing assemblies and the second bearing assembly 650 of FIG. 6A). The set 640 of the first bearing assemblies may be disposed in a first set of openings 631*a*, and the second bearing assembly 650 may be disposed in a second opening 631*b*. According to an embodiment, the openings (631*a*, 631*b*) of the rack gear case 630 may include a seating groove 632 in which the bearing assembly is seated.

According to an embodiment, the case 470 may include fastening holes (636*a*, 636*b*, 636*c*) for coupling to the second support member (e.g., the second support member 420 of FIG. 4). The case 470 may be coupled to the second support member 420 through a fastening member such as a screw coupled to the fastening holes (636*a*, 636*b*, 636*c*).

According to an embodiment, the rack gear case 630 of the case 470 may include an opening 637 for assembling the rack gear 520. The rack gear 520 may be coupled to the first support member (e.g., the first support member 410 of FIG. 4) disposed in a lower part of the rack gear 520 (e.g., the second surface 524 of FIG. 7) with the fastening member, such as a screw, inserted through the opening 637. The screw passing through the opening 637 may not be coupled to the rack gear case 630, but may fasten only the rack gear 520 and the first support member 410.

Figure 11A:
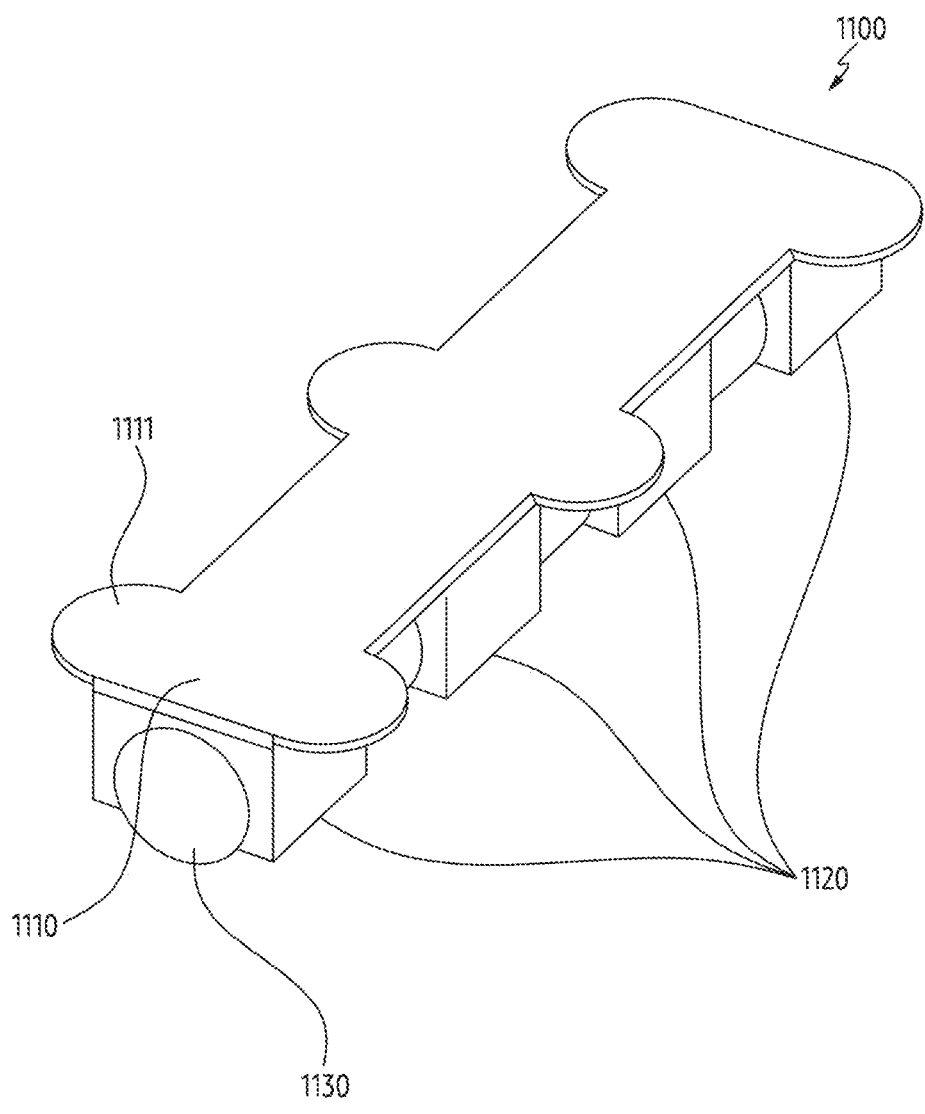
FIGS. 11A and 11B are perspective views illustrating an example bearing assembly included in a driving unit assembly according to various embodiments.
Figure 11B:
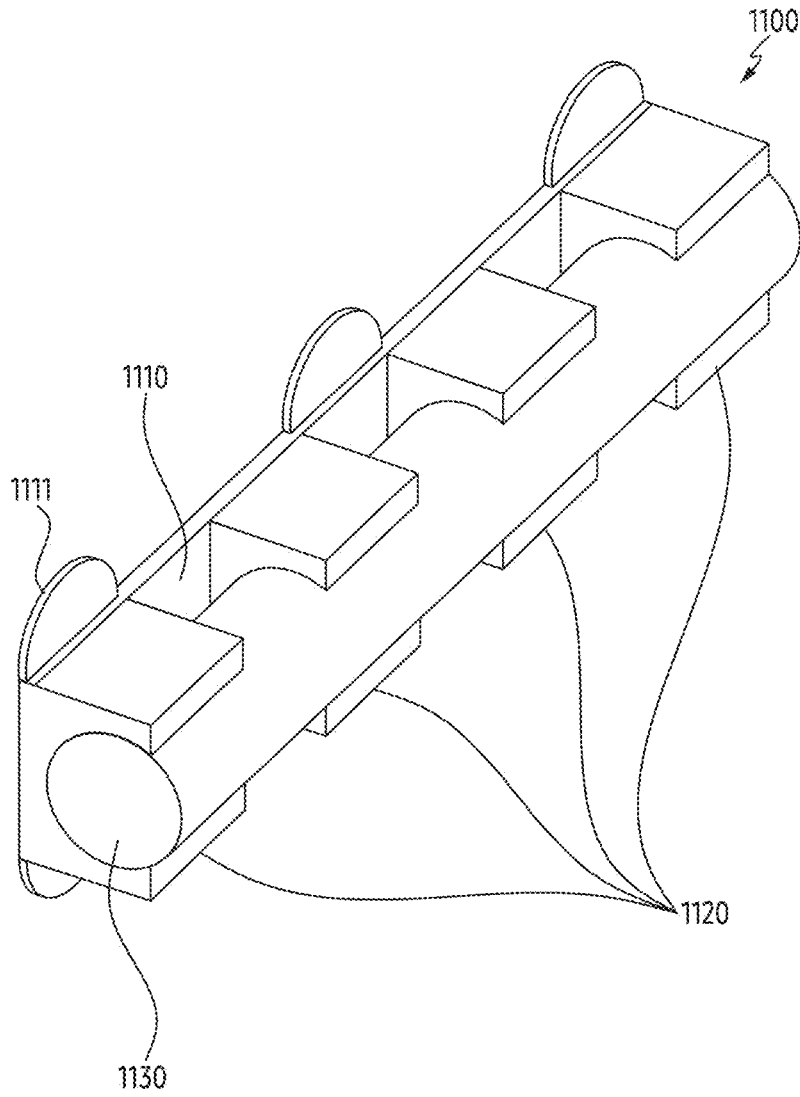

FIGS. 11A and 11B are perspective views illustrating a bearing assembly included in the driving unit assembly according to various embodiments.

Referring to FIGS. 11A and 11B, a bearing assembly 1100 may include a fixing plate 1110, a bearing 1130, and a bearing support 1120. The fixing plate 1110 may include a protrusion 1111 accommodated in a groove (e.g., the groove 632 of FIG. 10) formed at a periphery of one of the openings (e.g., the openings (631*a*, 631*b*) of FIG. 10). The protrusion 1111 may be attached to the groove 632. For example, the protrusion 1111 may be coupled to the groove 632 using welding, or may be attached to the groove 632 with an adhesive member such as, e.g., a double-sided tape or bond.

According to an embodiment, the bearing 1130 may be disposed to be in contact with the first surface 522 of the rack gear 520. The bearing 1130 may be disposed perpendicular to the movement direction of the rack gear 520. The bearing 1130 may include a roller or pin that may be rotated by the movement of the rack gear 520. The bearing 1130 may be a roller bearing or a needle bearing. However, the disclosure is not limited thereto, and the bearing 1130 may be a ball bearing.

According to an embodiment, the bearing supporting portion part 1120 may surround a portion of the bearing 1130. The bearing supporting portion 1120 may be fixed to a surface of the fixing plate 1110 facing a plurality of gear teeth and rotatably support the bearing 1130. The bearing supporting portion 1120 may rotatably support the bearing 1130, exposing a portion of a side surface (e.g., a side surface of a cylinder) of the bearing 1130. The exposed portion of the side surface of the bearing 1130 may be in contact with the first surface 522 of the rack gear 520.

According to an embodiment, when the bearing 1130 is a ball bearing, the bearing supporting portion 1120 may be formed such that a portion of a spherical surface of a plurality of ball bearings is exposed. For example, the bearing supporting portion 1120 may be in the form of a case accommodating a plurality of ball bearings, and may include an opening through which a portion of the spherical surface of the ball bearing may be exposed. The opening may be plural, and each of the plurality of openings may correspond one-to-one to each of the plurality of ball bearings.

According to an embodiment, the bearing assembly 1100 may be easily coupled to the rack gear case 630 by seating the protrusion 1111 of the fixing plate 1110 into the groove 632.

Figure 12:
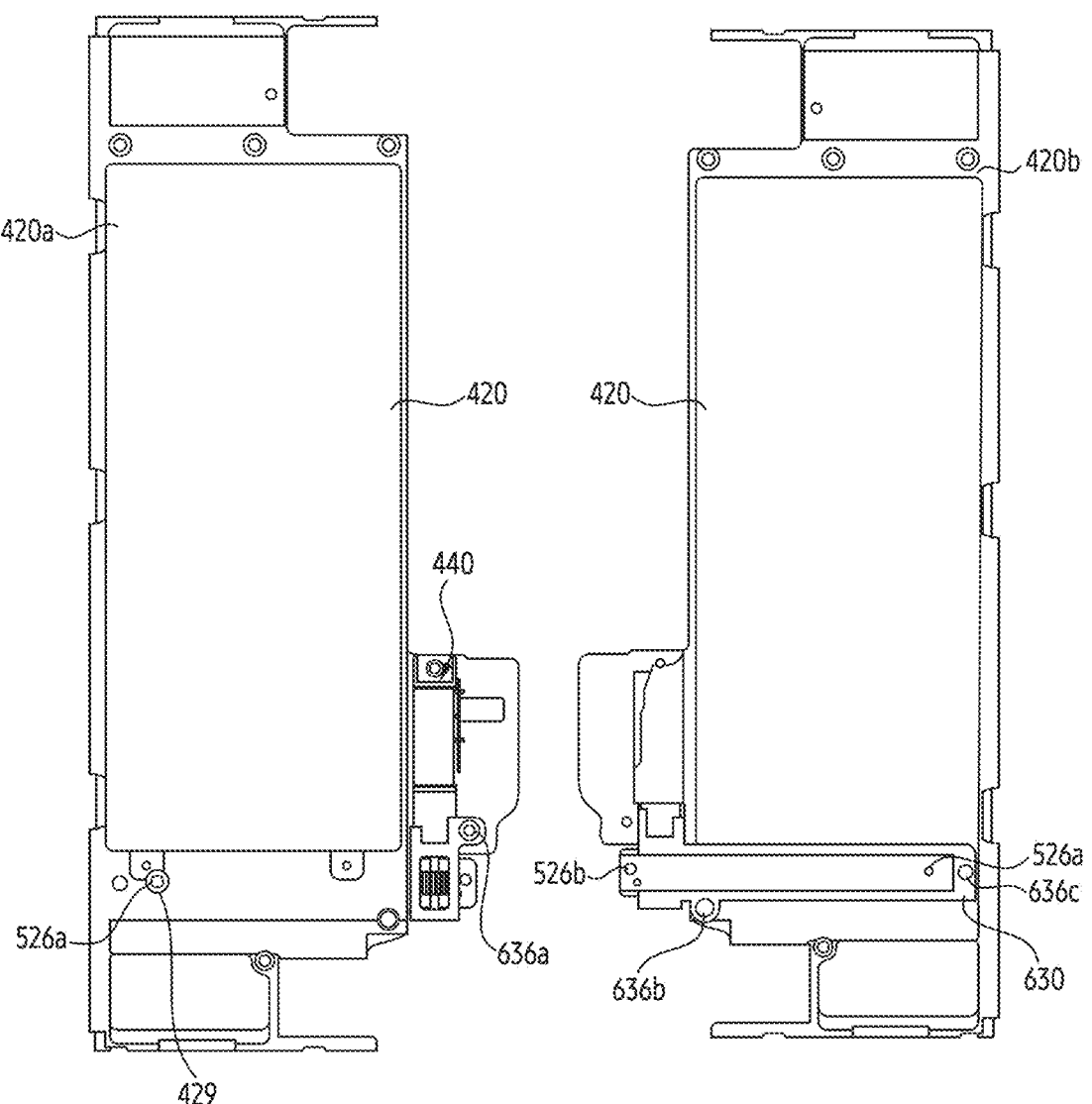
FIG. 12 is a diagram illustrating a coupled structure of a second support member and a driving unit assembly according to various embodiments.
Figure 13:
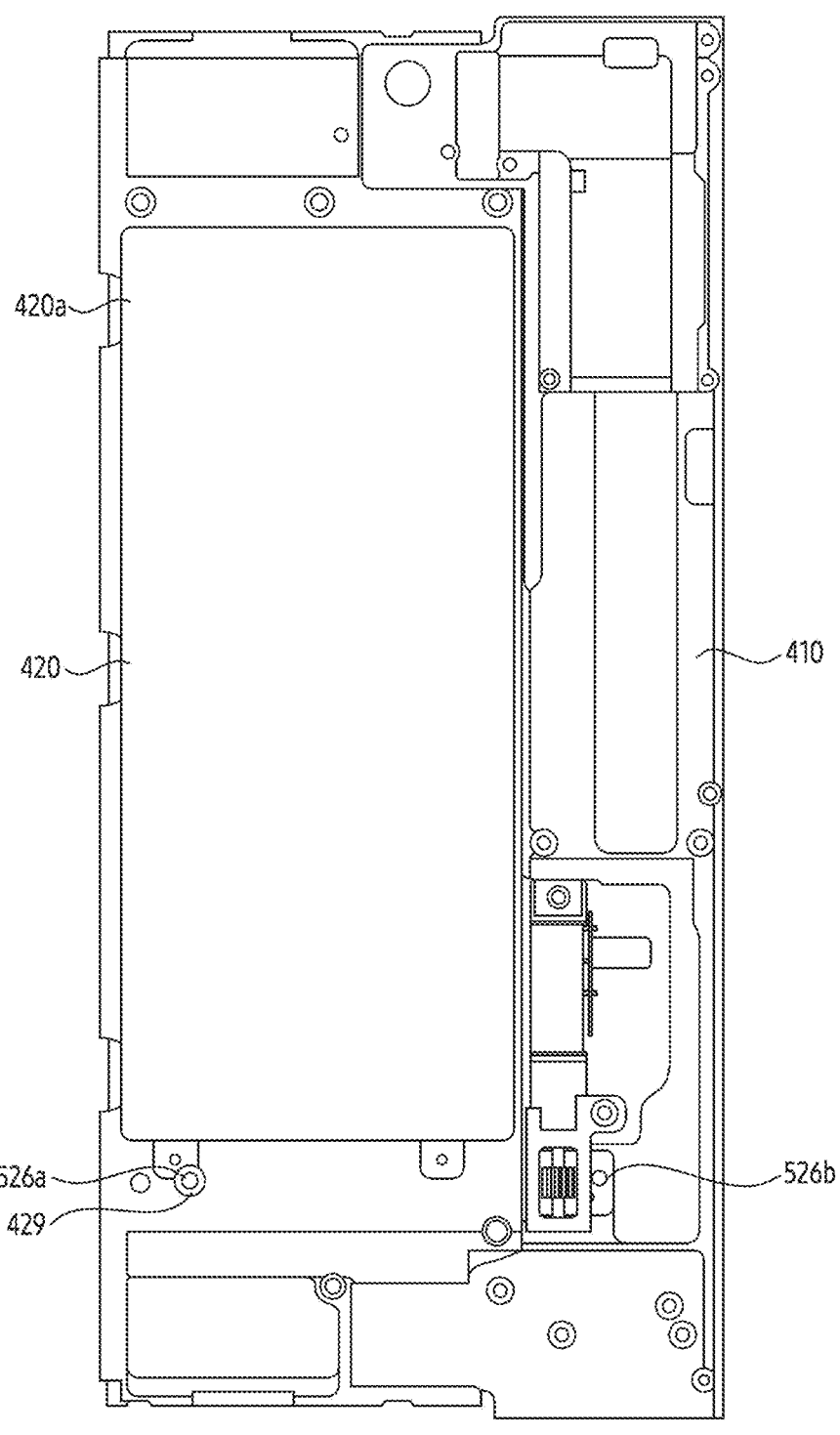
FIG. 13 is a diagram illustrating a coupled structure of a first support member, a second support member, and a driving unit assembly according to various embodiments.

FIG. 12 is a diagram illustrating a coupled structure of a second support member and a driving unit assembly according to various embodiments. FIG. 13 is a diagram illustrating a coupled structure of a first support member, a second support member, and a driving unit assembly according to various embodiments.

Referring to FIG. 12, the second support member 420 may be coupled to the driving unit assembly 440. The driving unit assembly 440 may include a first fastening hole 636a formed in the bracket 620, a second fastening hole 636b and a third fastening hole 636c formed in the rack gear case 630. The bracket 620 may be fixed to the second support member 420 with a first coupling member coupling the first fastening hole 636a and the second support member 420. The rack gear case 630 may be fixed to the second support member with a second coupling member coupling the second fastening hole 636b and the second support member 420 and a third coupling member coupling the third fastening hole 636c and the second support member 420. According to an embodiment, the rack gear case 630 of the driving unit assembly 440 may be inserted into a groove formed in the second support member 420 and may be assembled. For example, the bracket 620 may be disposed on a first surface 420a of the second support member 420, and the rack gear case 630 may be inserted into a groove formed on a second surface 420b of the second support member 420. The bracket 620 may be exposed in a direction toward the first surface 420a, and the rack gear case 630 may be exposed in a direction toward the second surface 420b. The first fastening hole 636a of the bracket 620 may be disposed in a direction in which the first surface 420a faces. The second fastening hole 636b and the third fastening hole 636c of the rack gear case 630 may be disposed in a direction in which the second surface 420b faces. According to an embodiment, the rack gear 520 may include a fourth fastening hole 526a and a fifth fastening hole 526b.

Referring to FIG. 13, the rack gear 520 may be fixed to the first support member 410 by coupling members coupled to each of the fourth fastening hole 526a and the fifth fastening hole 526b. The fourth fastening hole 526a of the rack gear 520 may be coupled to the first support member 410 by a fourth coupling member.

According to an embodiment, the second support member 420 may include an opening 429 corresponding to a position of the fourth coupling member. The opening 429 of the second support member 420 may be formed at a position corresponding to the opening (e.g., the opening 637 of FIG. 10) of the rack gear case 630. The fourth coupling member may be provided to the fourth fastening hole 526a of the rack gear 520 through the opening 429 formed in the second support member 420 and the opening 637 formed in the rack gear case 630. The fourth coupling member may couple the fourth fastening hole 526a and the first support member 410, and may not couple the rack gear case 630 and the second support member 420. The fifth coupling member may couple the fifth fastening hole 526b and the first support member 410.

According to an embodiment, the driving unit assembly 440 may be coupled to the second support member 420, and the rack gear 520 may be coupled to the first support member 410. As the rack gear 520 is pulled out from the inside of the rack gear case 630 or inserted into the rack gear case 630, the second support member 420 may be pulled out from the first support member 410 or inserted into the first support member 410.

According to an example embodiment, an electronic device (e.g., the electronic device 200 of FIG. 2A) may include: a first housing (e.g., the first housing 210 of FIG. 2A); a second housing (e.g., the second housing 220 of FIG. 2A) slidably coupled to the first housing; a flexible display (e.g., the display 230 of FIG. 2A) disposed on a surface formed by the first housing and the second housing and configured to be expanded or reduced according to sliding-in or sliding-out of the second housing; a rack gear (e.g., the rack gear 520 of FIG. 5) coupled to the first housing; a pinion gear (e.g., the pinion gear 510 of FIG. 5) configured to be driven by engaging with the rack gear; a motor driving mechanism comprising a motor (e.g., the driving unit 610 of FIG. 6A) coupled to the second housing and configured to rotate the pinion gear; a bracket (e.g., the bracket 620 of FIG. 6A) surrounding a portion of the motor driving mechanism and the pinion gear and coupled to the second housing; and a rack gear case (e.g., the rack gear case 630 of FIG. 6A) surrounding a first surface of the rack gear and both side surfaces of the rack gear.

According to an example embodiment, the rack gear may have protrusions configured to be inserted into a portion of the rack gear case on both side surfaces thereof. According to an example embodiment, the rack gear case may include coupling grooves into which each of the protrusions of the rack gear are configured to be inserted.

According to an example embodiment, each of the coupling grooves of the rack gear case may include a protective member comprising a foam material disposed at a part in contact with the rack gear and configured to reduce friction between the rack gear and the rack gear case, According to an example embodiment, an area of the first surface of the rack gear surrounded by the rack gear case and the bracket in the first state may be greater than an area of the first surface of the rack gear surrounded by the rack gear case and the bracket in the second state.

According to an example embodiment, the rack gear case may include a plurality of bearings configured to guide the rack gear to make a linear reciprocating motion and disposed toward the first surface of the rack gear, wherein the plurality of bearings may be in contact with the first surface of the rack gear in the first state in which the second housing is slid-in, and wherein two of the plurality of bearings may be in contact with the first surface of the rack gear in a second state in which the second housing is slid-out.

According to an example embodiment, two bearings in contact with the rack gear, among the plurality of bearings, in the second state may be spaced apart from each other by a first distance along a first direction that is a longitudinal direction of the rack gear. According to an example embodiment, a second distance between remaining bearings of the plurality of bearings may be less than the first distance.

According to an example embodiment, the two bearings may be located closer to the driving unit than the remaining bearings of the plurality of bearings, and may be in contact with the first surface of the rack gear in the first state and the second state.

According to an example embodiment, each of the coupling grooves of the rack gear case may include a ball bearing in contact with a side surface of the rack gear.

According to an example embodiment, an electronic device (e.g., the electronic device 200 of FIG. 2A) may include: a first support (e.g., the first support member 410 of FIG. 4); a second support (e.g., the second support member 420 of FIG. 4) slidably coupled to the first support in a first direction; a flexible display (e.g., the flexible display 230 of FIG. 4) disposed on one surface formed by the first support and the second support and configured to be expanded in a first direction (e.g., +x direction of FIG. 4) or reduced in a second direction (e.g., the –x direction of FIG. 4) according to movement of the second support; a rack gear (e.g., the rack gear 520 of FIG. 5) coupled to the first support; a pinion gear (e.g., the pinion gear 510 of FIG. 5) including a plurality of teeth (e.g., a plurality of teeth 521 of FIG. 6B) engaged with the rack gear; and a motor driving mechanism comprising a motor (e.g., the driving unit 610 of FIG. 6A) configured to rotate the pinion gear. According to an example embodiment, the electronic device may include a driving unit case (e.g., the bracket 620 of FIG. 6A) configured to support a part of the motor driving mechanism and a shaft. The driving unit case may surround a part of the motor driving mechanism, the shaft, and the pinion gear, and may be fixed to the second support. According to an example embodiment, the electronic device may include a rack gear case (e.g., the rack gear case 630 of FIG. 6A). The rack gear case may extend along the rack gear from a side surface of the driving unit case. The rack gear case may surround a first surface of the rack gear on which the plurality of teeth are disposed, a part of a second surface of the rack gear opposite to the first surface, and a side surface of the rack gear. The rack gear case may be in contact with the first surface of the rack gear on which the plurality of teeth are disposed, the part of the second surface of the rack gear opposite to the first surface, and the side surface of the rack gear.

According to an example embodiment, two bearings in contact with the rack gear, among the plurality of bearings, in the second state may be spaced apart from each other by a first distance along a first direction that is a longitudinal direction of the rack gear.

According to an example embodiment, a second distance between remaining bearings among the plurality of bearings may be less than the first distance.

According to an example embodiment, in a first state in which, of a first direction and a second direction (e.g., –x direction of FIG. 4) opposite to the first direction, the second support is movable in the first direction, the plurality of teeth may be surrounded by the rack gear case and the driver case, and in a second state in which the second support is movable in the second direction, some of the plurality of teeth may be exposed from the rack gear case and the driver case.

According to an example embodiment, the rack gear case may be configured to guide the rack gear to move in the first direction. The rack gear may be accommodated in the rack gear case in the first state. According to an example embodiment, the rack gear may be configured to be pulled-out from the rack gear case in the second state. According to an example embodiment, the rack gear may include a plurality of bearings disposed on a surface toward the gear teeth.

According to an example embodiment, at least one of the plurality of bearings may rotatably contact the rack gear.

According to an example embodiment, the rack gear case may include an additional bearing (e.g., a bearing of the second bearing assembly 650 of FIG. 6A) distinguished from the plurality of bearings included in a set of first bearing assemblies (e.g., the set 640 of the first bearing assemblies of FIG. 6A).

According to an example embodiment, the bearings included in the set of the first bearings may be spaced apart from each other by a first distance along the first direction, and a second distance between one bearing (e.g., the bearing of the first bearing assembly 610 of FIG. 8) of the plurality of bearings positioned withing a specified distance to the additional bearing, and the additional bearing may be less than the first distance.

According to an example embodiment, the bearing may include one of a ball bearing, a needle bearing, a roller bearing, a magnetic bearing, or a fluid bearing.

According to an example embodiment, in the second state, a bearing within a specified distance to the motor driving mechanism among the plurality of bearings may be substantially always in contact with a first surface of the rack gear on which the plurality of gear teeth are formed.

According to an example embodiment, the rack gear case may include a plurality of bearings configured to guide the rack gear to make a linear reciprocating motion in the first direction and disposed on a surface toward the gear teeth.

According to an example embodiment, in the first state, the plurality of bearings may be in contact with a surface of the rack gear on which the plurality of gear teeth are formed.

According to an example embodiment, the rack gear case may include an additional bearing disposed between the plurality of bearings and the motor driving mechanism, and in the second state, a bearing within a specified distance to the motor driving mechanism among the plurality of bearings and the additional bearing may be in contact with a surface of the rack gear on which the plurality of gear teeth are formed.

According to an example embodiment, the rack gear case may include a protective member comprising a protective material (e.g., the protective member 670 of FIG. 9) in contact with a side surface of the rack gear.

According to an example embodiment, the protective member may include a ball bearing or a material having elasticity.

According to an example embodiment, the rack gear case may include a plurality of openings (e.g., the openings (631a, 631b) of FIG. 10) formed on a surface facing the rack gear, and a plurality of bearing assemblies (e.g., the plurality of bearing assemblies (640, 650) of FIG. 6A) configured to guide the rack gear to make a linear reciprocating motion in the first direction and disposed in the plurality of openings.

According to an example embodiment, the bearing assembly may include a fixing plate (e.g., the fixing plate 1110 of FIG. 11A), a bearing 1130, and a bearing supporting portion.

According to an example embodiment, the fixing plate may include a protrusion accommodated in a recess formed in a periphery of the opening and protruding from a side surface of the fixing plate.

According to an example embodiment, the bearing may be in contact with a first surface (e.g., the first surface 522 of FIG. 6B) on which a plurality of teeth (e.g., the plurality of teeth 521 of FIG. 6B) of the rack gear are formed.

According to an example embodiment, the bearing supporting portion may be fixed to one surface of the fixing plate facing the plurality of gear teeth, and may rotatably support the bearing.

According to an example embodiment, the rack gear may be fixed to the first support member with a first coupling member comprising a fastener.

According to an example embodiment, the second support may form an opening at a position corresponding to the first coupling member.

According to an example embodiment, the driving unit case may be fixed to the second support with a second coupling member comprising a fastener.

According to an example embodiment, the rack gear case may be fixed to the second support with a third coupling member comprising a fastener.

According to an example embodiment, the electronic device may further include a book cover and a slide cover (e.g., the book cover 216 of FIG. 4, e.g., the slide cover 221 of FIG. 4), the slide cover surrounding the second support and configured to move together with the second support.

According to an example embodiment, the second support may be surrounded by the slide cover and a portion of the display.

According to an example embodiment, the electronic device (e.g., the electronic device 200 of FIG. 2A) may include a first housing (e.g., the first housing 210 of FIG. 2A), a second housing (e.g., the second housing 220 of FIG. 2A), and a display (e.g., the display 230 of FIG. 2A).

According to an example embodiment, the second housing may be slidably coupled to the first housing.

According to an example embodiment, the display may be disposed on a surface formed by the first housing and the second housing, and may be configured to be expanded or reduced in the first direction according to sliding-in or sliding-out movement of the second housing.

According to an example embodiment, the electronic device (e.g., the electronic device 200 of FIG. 2A) may include a driving unit assembly (e.g., the driving unit assembly 440 of FIG. 4) including a rack gear connected to the first housing, a pinion gear configured to be driven by engaging with the rack gear, a motor driving mechanism comprising a motor coupled to the second housing and configured to rotate the pinion gear, a bracket (e.g., the bracket 620 of FIG. 6A) surrounding a portion of the motor driving mechanism and the pinion gear and disposed in the second support, and a rack gear case (e.g., the rack gear case 630 of FIG. 6A) surrounding a first surface of the rack gear and a side surface of the rack gear from one side surface of the bracket.

According to an example embodiment, the rack gear case may include a plurality of bearings configured to guide the rack gear to make a linear reciprocating motion and disposed to face the first surface of the rack gear. At least one of the plurality of bearings may be in contact with the rack gear.

According to an example embodiment, in the first state in which the second housing is slid-in, the plurality of teeth may be surrounded by the rack gear case and the driving unit case.

According to an example embodiment, in the second state in which the second housing is slid-out, some of the plurality of teeth may be exposed from the rack gear case and the motor driving mechanism case.

According to an example embodiment, the rack gear case may include a plurality of bearings configured to guide the rack gear to make a linear reciprocating motion in the first direction and disposed on a surface facing the gear teeth.

According to an example embodiment, at least one of the plurality of bearings may be in contact with the rack gear.

According to an example embodiment, in the first state, the plurality of bearings may be in contact with a surface of the rack gear on which the plurality of gear teeth are formed.

According to an example embodiment, in the second state, a first bearing (e.g., a bearing of the second bearing assembly 640b of FIG. 8) within a specific distance to the motor driving mechanism among the plurality of bearings and a second bearing (e.g., a bearing of the first bearing assembly 640a of FIG. 8) within a specified distance to the first bearing among the plurality of bearings may be in contact with a surface of the rack gear on which the plurality of gear teeth are formed.

According to an example embodiment, the rack gear case may include a protective member comprising a protective material in contact with a side surface of the rack gear.

According to an embodiment, the rack gear case may include a plurality of openings (e.g., a plurality of openings (631a, 631b) of FIG. 10) and a plurality of bearing assemblies including at least one bearing (e.g., a plurality of bearing assemblies (640, 650) of FIG. 6A).

According to an example embodiment, the plurality of openings may be formed on a surface facing the rack gear.

According to an example embodiment, the plurality of bearing assemblies may be configured to guide the rack gear to make a linear reciprocating motion in the first direction, and may be disposed in the plurality of openings.

The bearing assembly may include a fixing plate (e.g., the fixing plate 1110 of FIG. 11A), a bearing (e.g., the bearing 1130 of FIG. 11A), and a bearing supporting portion.

According to an example embodiment, the fixing plate may include a protrusion seated in a recess formed at a periphery of the opening.

According to an example embodiment, the bearing may be in contact with a first surface of the rack gear.

According to an example embodiment, the bearing supporting portion may be fixed to a surface of the fixing plate facing the plurality of gear teeth.

According to an example embodiment, the bearing supporting portion may rotatably support the bearing.

According to an example embodiment, the first housing may include a first support configured to support a portion of the display and a book cover configured to surround the first support.

According to an example embodiment, the second housing may include a second support slidably coupled to the first support in the first direction and configured to support the remaining portion of the display, and a sliding cover configured to surround the second support and move together with the second support.

According to an example embodiment, the second support may be surrounded by the slide cover and a portion of the display. The rack gear case may be configured to support a first surface of the rack gear on which the plurality of teeth are disposed, a portion of a second surface of the rack gear opposite to the first surface, and a side surface of the rack gear. The rack gear case may be in contact with the first surface of the rack gear on which the plurality of teeth are disposed, the portion of the second surface of the rack gear opposite to the first surface, and the side surface of the rack gear.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element. No claim element is to be construed under the provisions of 35 U.S.C. § 112, sixth paragraph, unless the element is expressly recited using the phrase "means for" or "means."

As used in connection with various embodiments of the disclosure, the term "module" may include a unit implemented in hardware, software, or firmware, or any combination thereof, and may be interchangeably used with other terms, for example, "logic", "logic block", "part", or "circuit". A module may be a single integral component, or a minimum unit or part thereof, adapted to perform one or more functions. For example, according to an example, the module may be implemented in a form of an application-specific integrated circuit (ASIC).

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a first housing;
a second housing slidably coupled to the first housing;
a flexible display supported by the first housing and the second housing, the flexible display configured to expand and/or contract in response to sliding movement of the second housing;
a rack gear fixedly coupled to the first housing;
a pinion gear rotatably engaged with the rack gear;
a motor driving mechanism comprising a motor coupled to the second housing and configured to rotate the pinion gear;
a bracket surrounding at least a portion of the motor driving mechanism and the pinion gear and coupled to the second housing; and
a rack gear case enclosing a first surface of the rack gear and both lateral surfaces of the rack gear;
wherein the rack gear includes protrusions at both lateral surfaces, and
the rack gear case includes coupling grooves, and
wherein the protrusions of the rack gear are configured to be inserted into the coupling grooves.

2. The electronic device of claim 1, wherein the coupling grooves of the rack gear case includes a foam material configured to reduce a friction on the rack gear.

3. The electronic device of claim 1, wherein an area of the first surface of the rack gear enclosed by the rack gear case and the bracket in a first state in which the second housing is slid-in into the first housing is greater than an area of the first surface of the rack gear enclosed by the rack gear case and the bracket in a second state in which the second housing is slid-out from the first housing.

4. The electronic device of claim 1, wherein the rack gear case includes a plurality of bearings disposed towards the first surface of the rack gear and configured to guide the rack gear to make a linear reciprocating motion,
wherein the plurality of the bearings are in contact with the first surface of the rack gear, in the first state in which the second housing is slid-in, and
wherein two bearings of the plurality of the bearings are in contact with the first surface of the rack gear, in the second state in which the second housing is slid-out.

5. The electronic device of claim 4, wherein the two bearings of the plurality of bearings in contact with the rack gear are spaced apart from each other by a first length along a first direction which is a longitudinal direction of the rack gear, and
wherein a second length between remaining bearings of the plurality of bearings is shorter than the first length.

6. The electronic device of claim 4, wherein the two bearings are closer to the motor driving mechanism than remaining bearings of the plurality of the bearings and are in contact with to the first surface of the rack gear in the first state and the second state.

7. The electronic device of claim 4, the plurality of the bearings include any of a ball bearing, a needle bearing, a magnetic bearing or a fluid bearing.

8. The electronic device of claim 1, wherein each of the coupling grooves of the rack gear case include a ball bearing in contact with a lateral surface of the rack gear.

9. The electronic device of claim 1, wherein the rack gear case includes:

a plurality of openings formed on a surface facing the rack gear; and a plurality of bearing assemblies disposed in the plurality of openings and guiding the rack gear to make a linear reciprocating motion, wherein the bearing assemblies include:

a fixing plate having a protrusion accommodated in a recess formed in a periphery of the opening;

a bearing in contact with the rack gear; and a bearing supporting portion rotatably supporting the bearing and fixed on a surface of the fixing plate facing gear teeth of the rack gear.

10. The electronic device of claim 1, wherein the rack gear is fixed to the first housing through a first coupling member comprising a fastener.

11. The electronic device of claim 10, wherein the second housing has an opening corresponding to the first coupling member.

12. The electronic device of claim 1, wherein the bracket is fixed to the second housing through a second coupling member comprising a fastener, and wherein the rack gear case is fixed to the second housing through a third coupling member comprising a fastener.

13. The electronic device of claim 1, wherein the protrusion contacts the two bearings, based on the second housing being slid-out from the first housing.

14. The electronic device of claim 1, wherein the first housing includes a first support configured to support a portion of the display and a book cover surrounding a first support, and wherein the second housing includes a second support configured to support a remaining portion of the display and slidably coupled to the first support, and a slide cover surrounding the second support and configured to move together with the second support.

15. The electronic device of claim 14, wherein the second support is surrounded by the slide cover and the portion of the display.

16. An electronic device comprising:

a first housing;

a second housing slidably coupled to the first housing;

a flexible display, supported by the first housing and the second housing, the flexible display configured to expand and/or contract based on sliding-in or sliding-out movement of the second housing; and a driving unit assembly including:

a rack gear configured to be coupled to the first housing;

a pinion gear driven by being engaged with the rack gear;

a motor driving mechanism comprising a motor coupled to the second housing and configure to rotate the pinion gear;

a bracket surrounding a portion of the motor driving mechanism and the pinion gear and coupled to the second housing; and a rack gear case surrounding a first surface of the rack gear and both lateral surfaces of the rack gear;

wherein the rack gear case including a plurality of bearings that are disposed towards the first surface of the rack gear and configured to guide the rack gear to make a linear reciprocating motion, and wherein at least one of the plurality of bearings is in contact with the rack gear.

17. The electronic device of claim 16, wherein the plurality of bearings are in contact with a surface of the rack gear on which gear teeth are disposed, in a first state that the second housing is slid-in, and wherein a first bearing among the plurality of bearings closer to the motor driving unit and a second bearing closer to the first bearing among the plurality of bearings are in contact with the surface of the rack gear on which gear teeth are disposed, in the second state in which the second housing is slid out.

18. The electronic device of claim 16, wherein each of grooves of the rack gear case includes a protection member including foam disposed on a portion in contact with the rack gear.

19. The electronic device of claim 16, wherein the rack gear case includes:

a plurality of openings formed on a surface of the rack gear case facing the rack gear;

a plurality of bearing assemblies disposed in the plurality of openings and configured to guide the rack gear to make a linear reciprocating motion, and wherein the bearing assemblies include:

a fixing plate having a protrusion accommodated in a recess formed in a periphery of the opening;

a bearing in contact with the rack gear; and a bearing supporting portion rotatably supporting the bearing and fixed on a surface of the fixing plate facing gear teeth of the rack gear.

20. The electronic device of claim 16, wherein the first housing includes:

a first support configured to support a portion of the display; and a book cover surrounding a first support, and wherein the second housing includes:

a second support configured to support a remaining portion of the display and slidably coupled to the first support, and a slide cover surrounding the second support and configured to move together with the second support.

* * * * *